United States Patent
Liu et al.

(10) Patent No.: US 10,292,170 B2
(45) Date of Patent: May 14, 2019

(54) METHOD AND DEVICE FOR ADAPTIVE DISCOVERY OF LICENSED-SHARED-ACCESS SYSTEM INTERFERENCE

(71) Applicant: ZTE CORPORATION, Shenzhen (CN)

(72) Inventors: Xing Liu, Shenzhen (CN); Feng Xie, Shenzhen (CN); Ting Miao, Shenzhen (CN); Yin Gao, Shenzhen (CN); Feng Bi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 7 days.

(21) Appl. No.: 15/545,158

(22) PCT Filed: Nov. 4, 2015

(86) PCT No.: PCT/CN2015/093801
§ 371 (c)(1),
(2) Date: Jul. 20, 2017

(87) PCT Pub. No.: WO2016/115935
PCT Pub. Date: Jul. 28, 2016

(65) Prior Publication Data
US 2018/0014310 A1    Jan. 11, 2018

(30) Foreign Application Priority Data
Jan. 20, 2015    (CN) .......................... 2015 1 0030442

(51) Int. Cl.
*H04L 12/24*    (2006.01)
*H04W 72/08*    (2009.01)
(Continued)

(52) U.S. Cl.
CPC ........ *H04W 72/082* (2013.01); *H04B 17/345* (2015.01); *H04L 41/0816* (2013.01);
(Continued)

(58) Field of Classification Search
None
See application file for complete search history.

(56) References Cited

U.S. PATENT DOCUMENTS 8,068,411 B2    11/2011    Vasseur et al.
8,264,971 B2    9/2012    Alfano et al.
(Continued)

FOREIGN PATENT DOCUMENTS

CN    104244276    12/2014
EP    3174329    5/2017
KR    20070084594    8/2007

OTHER PUBLICATIONS

Mueck Markus Dominik et al.: "Licensed shared access—State-of-the-art and current challe", 2014 1st International Workshop on Cognitive Cellular Systems (CCS), IEEE, Sep. 2, 2014, pp. 1-5, XP032667933, retried on Oct. 21, 2014.
(Continued)

*Primary Examiner* — Brian S Roberts
(74) *Attorney, Agent, or Firm* — Plumsea Law Group, LLC

(57) ABSTRACT

A method and apparatus are described for adaptive interference discovery of a licensed shared access (LSA) system. The method includes: an LSA controller selects a measurement node according to interference protection information of an LSA licensed system; the LSA controller sends a measurement configuration message to the measurement node; and the LSA controller receives a measurement response message returned by the measurement node and determines whether to perform LSA spectrum resource reconfiguration according to the measurement response message.

18 Claims, 11 Drawing Sheets

(51) Int. Cl.
*H04W 16/14* (2009.01)
*H04B 17/345* (2015.01)

(52) U.S. Cl.
CPC .......... *H04W 16/14* (2013.01); *H04L 41/085* (2013.01); *Y04S 40/162* (2013.01)

(56) References Cited

U.S. PATENT DOCUMENTS

| | | | |
|---|---|---|---|
| 2013/0295948 A1* | 11/2013 | Ye | H04W 72/0453 455/452.1 |
| 2014/0011509 A1 | 1/2014 | Markwart et al. | |
| 2014/0162617 A1* | 6/2014 | Mueck | H04W 8/245 455/418 |
| 2014/0192685 A1* | 7/2014 | Mueck | H04W 72/04 370/280 |
| 2015/0036509 A1* | 2/2015 | Lopes | H04W 16/10 370/241.1 |
| 2016/0183269 A1* | 6/2016 | Badic | H04B 15/00 455/454 |

OTHER PUBLICATIONS

Extended European Search Report dated Nov. 20, 2017 for European Patent Application No. 15878603.8.
International Search Report for PCT/CN2015/093801, English Translation attached to original, Both completed by the Chinese Patent Office dated Jan. 20, 2016 All together 5 Pages.

\* cited by examiner

METHOD AND DEVICE FOR ADAPTIVE DISCOVERY OF LICENSED-SHARED-ACCESS SYSTEM INTERFERENCE

CROSS-REFERENCE TO RELATED APPLICATION

This application is the U.S. national phase of PCT Application No. PCT/CN2015/093801 filed Nov. 4, 2015, which claims priority to Chinese Application No. 201510030442.5 filed Jan. 20, 2015, the disclosures of which are incorporated in their entirety by reference herein.

TECHNICAL FIELD

The present disclosure relates to, but is not limited to, the field of wireless communication.

BACKGROUND

With the continuous progress of radio technologies, various radio services emerge in large numbers, but spectrum resources on which the radio services rely are limited, and the spectrum resources manifest an extreme shortage situation with respect to people's increasing demands for bandwidth; and on the other hand, the utilization of the spectrum resources is not high in the traditional mode of fixed spectrum allocation. In a sense, such spectrum allocation mechanism in which the spectrum resources are fixedly allocated to licensed systems causes the extreme shortage situation of the spectrum resources, since users of the spectrum resources do not always occupy the spectrum resources anywhere 24 hours a day and 7 days a week.

The cognitive radio technology breaks the spectrum fixed allocation mechanism in the traditional sense, and dynamically allocates the spectrum resources among systems, improving the utilization efficiency of spectrum resources. A typical licensed shared access (LSA) technology provides an approach in which an LSA licensed system and an LSA secondary system share the same spectrum resource under a regulatory framework. The same spectrum resource is called LSA spectrum resource, that is, the spectrum resource shared by the LSA licensed system and the LSA secondary system. The LSA licensed system refers to an actual licensed user of the LSA spectrum resource, that is, an actual owner of the spectrum resource; the LSA secondary system refers to a user who is licensed by a regulatory authority and can share the LSA spectrum resource with the LSA licensed system. However, such licensed only shows that the LSA secondary system can conditionally use the LSA spectrum resource, and the actual owner of the LSA spectrum resource is still the LSA licensed system. In other words, the LSA secondary system licensed by the regulatory authority has only conditional usage rights for the LSA spectrum resource, and the actual owner of the LSA spectrum resource is still owned by the LSA licensed system. Generally in the course of use, the LSA licensed system contains two meanings: one is the personnel or institution of the LSA licensed system, that is, the personnel or institution to which the actual licensed party of the LSA spectrum resource belongs, and this meaning is generally used in occasions, such as spectrum negotiation, etc.; the other is an LSA licensed device, that is, a transmitting device, such as a TV transmitting system, base station and other related wireless communication transmission devices, used by the LSA licensed system. Likewise, the LSA secondary system also contains two meanings: one is the personnel or institution of the LSA secondary system, that is, the personnel or institution to which the LSA secondary system belongs, and this meaning is generally used in occasions, such as spectrum negotiation, etc.; the other is an LSA secondary system device, that is, a transmitting device, such as a base station, relay, micro base station and other related wireless communication transmission devices, used by the LSA secondary system. For a clearer description, the content herein is described directly using the LSA licensed system device or the LSA secondary system device.

A primary and secondary relationship described above when the LSA spectrum resource is used also determines that the LSA secondary user device must meet the interference protection requirements of the LSA licensed system. In the architecture of the related technology, as shown in FIG. 1, an LSA Repository (LR) takes charge of the protection of LSA licensed user, and is connected with the national regulatory authority (NRA) and the LSA licensed user Incumbent through links $LSA_2$ and $LSA_3$, respectively, to obtain related spectrum usage information of the LSA licensed user, interference protection regulation information, and policy information of the national regulatory authority. Moreover, the information is sent through a link $LSA_1$ to a spectrum management node of the LSA secondary user, i.e., an LSA controller (LC), and the LC configures working parameters for subordinate LSA secondary user devices according to the related interference protection regulation. In this process, the LC calculates a maximum transmitting power limitation of the LSA secondary user device (such as an LTE macro base station eNB) on a certain LSA spectrum resource according to a theory. However, in theoretical calculation, a setting of a propagation model is difficult to fully conform with the actual environment, and a calculation result is hard to avoid occurrence of deviations; or in the process where the eNB uses the spectrum, a change occurs in the propagation environment and causes interference to the LSA licensed user, and the LSA secondary system cannot discover the interference in time and make appropriate adjustments, which is not allowed by the LSA technology.

SUMMARY

The following is a summary of the subject matter described in detail in this document. The summary is not intended to limit the protection scope of the claims.

The document realizes accurate and timely interference discovery in LSA systems.

A method for adaptive interference discovery of a licensed shared access (LSA) system includes:

selecting, by an LSA controller, a measurement node according to interference protection information of an LSA licensed system;

sending, by the LSA controller, a measurement configuration message to the measurement node; and receiving, by the LSA controller, a measurement response message returned by the measurement node and determining whether to perform an LSA spectrum resource reconfiguration according to the measurement response message.

In an exemplary embodiment, the interference protection information of the LSA licensed system provided by an LSA repository includes one or more pieces of the following information: LSA spectrum resource frequency point, bandwidth, protection zone of the LSA licensed system, interference tolerance threshold at an edge of the protection zone, and transmission information of the LSA licensed system.

In an exemplary embodiment, the protection zone of the LSA licensed system means that an LSA licensed user within the zone is not allowed to suffer harmful interference, and the harmful interference refers to interference that exceeds a predefined interference tolerance threshold; and the transmission information of the LSA licensed system is used for the measurement node to identify a transmitting signal of the LSA licensed system.

In an exemplary embodiment, selecting, by an LSA controller, a measurement node according to interference protection information of an LSA licensed system includes: selecting, by the LSA controller, one or more network devices located at an edge of a protection zone of the LSA licensed system as the measurement node/nodes.

In an exemplary embodiment, the measurement configuration message is used to instruct the measurement node to measure whether a target LSA secondary user device causes interference to an LSA licensed user within a protection zone of the LSA licensed system;

the measurement response message carries a measurement result; and the target LSA secondary user device refers to an LSA secondary user device that has been configured or is intended to be configured with spectrum resource of the LSA licensed system or an adjacent frequency of the spectrum resource of the LSA licensed system.

In an exemplary embodiment, sending, by the LSA controller, a measurement configuration message to the measurement node includes:

sending, by the LSA controller, the measurement configuration message directly to the selected measurement node, or sending, by the LSA controller, the measurement configuration message to an operation, administration and maintenance side to which the selected measurement node belongs, and forwarding, by the operation, administration and maintenance side, the measurement configuration message to the selected measurement node; wherein the measurement configuration message includes one or more pieces of: measurement identification, measured frequency point, bandwidth, working frequency point and bandwidth of a target LSA secondary user device, information of the LSA licensed system, radio access technology which the target LSA secondary user device uses, duplex mode, uplink and downlink information corresponding to the measured frequency point and bandwidth, transmission information of the target LSA secondary user device, measurement parameter, interference tolerance threshold of the LSA licensed system, number of measurements, measurement period, and measurement report configuration.

In an exemplary embodiment, the transmission information of the target LSA secondary user device is used for the measurement node to identify the target LSA secondary user device.

In an exemplary embodiment, the measurement parameter is used to indicate interference generated by the target LSA secondary user device at the measurement node; and the measurement parameter includes one or more of the following: receiving power of the predefined transmission information of the target LSA secondary user device at the measurement node; a difference between total receiving powers at the measurement node before and after the target LSA secondary user device operates on the LSA spectrum resource; and total receiving power generated by other systems at the measurement node, except the LSA licensed system.

In an exemplary embodiment, the measurement report configuration is used to indicate a mode in which the measurement response message is reported; and the mode in which the measurement response message is reported includes one or more of the following: single reporting mode, periodic reporting mode, and event triggered reporting mode;

wherein the single reporting mode means that a measurement result is reported once through the measurement response message;

the periodic reporting mode means that the measurement result is reported periodically through the measurement response message, and the measurement report configuration in the mode further includes: a reporting period and an amount of reporting; and the event triggered reporting mode means that the measurement result is reported through the measurement response message when the measurement result satisfies a reporting condition, and the measurement report configuration in the mode further includes: the reporting condition and the amount of reporting.

In an exemplary embodiment, the measurement report configuration is used to indicate a content of the measurement report; and the content of the measurement report includes one or more pieces of the following information: absolute power value of the interference; indication that is used to indicate whether there is high interference, i.e., indication information that is used to indicate whether the absolute power value of the interference obtained by interference measurement exceeds the interference tolerance threshold of the LSA licensed system; absolute power value of the interference or frequency domain information corresponding to the high interference; and absolute power value of the interference or time domain information corresponding to the high interference.

In an exemplary embodiment, determining, by the LSA controller, whether to perform LSA spectrum resource reconfiguration according to the measurement response message includes:

determining, by the LSA controller, to perform the LSA spectrum resource reconfiguration when the measurement response message returned by the measurement node shows that the measurement parameter exceeds the interference tolerance threshold at an edge of a protection zone of the LSA licensed system.

A method for adaptive interference discovery of a licensed shared access (LSA) system includes:

receiving, by a measurement node, a measurement configuration message sent by an LSA controller; and performing, by the measurement node, measurement according to the measurement configuration message and sending a measurement response message to the LSA controller;

wherein the measurement is used to determine whether a target LSA secondary user device causes interference to an LSA licensed user within a protection zone of the LSA licensed system.

In an exemplary embodiment, the measurement node has a capability of measuring and interacting with the LSA controller and is used for measuring whether the target LSA secondary user device causes the interference to the LSA licensed user within the protection zone of the LSA licensed system.

In an exemplary embodiment, receiving, by a measurement node, a measurement configuration message sent by an LSA controller includes:

receiving, by the measurement node, the measurement configuration message directly from the LSA controller, or receiving, by the measurement node, the measurement configuration message sent from the LSA controller and forwarded by an operation, administration and maintenance side;

the measurement configuration message includes one or more pieces of the following information: measurement identification, measured frequency point, bandwidth, working frequency point and bandwidth of the target LSA secondary user device, information of the LSA licensed system, radio access technology which the target LSA secondary user device uses, duplex mode, uplink and downlink information corresponding to the measured frequency point and bandwidth, transmission information of the target LSA secondary user device, measurement parameter, the number of measurements, measurement period, and measurement report configuration.

In an exemplary embodiment, performing, by the measurement node, measurement according to the measurement configuration message includes:

performing, by the measurement node, a measurement operation specified in the measurement configuration message to obtain a measurement result;

or cooperating, by the measurement node, with subordinate terminals to jointly perform the measurement operation specified in the measurement configuration message, and gathering, by the measurement node, measurement reports of the subordinate terminals to obtain a final measurement result;

or configuring, by the measurement node, the subordinate terminals to perform the measurement operation specified in the measurement configuration message and receiving the measurement reports of the subordinate terminals to obtain the measurement result.

In an exemplary embodiment, the measurement response message is used to indicate the measurement result to the LSA controller, including one or more pieces of the following information: absolute power value of the interference; indication that is used to indicate whether there is high interference, i.e., indication information that is used to indicate whether the absolute power value of the interference obtained by interference measurement exceeds the interference tolerance threshold of the LSA licensed system; absolute power value of the interference or frequency domain information corresponding to the high interference; and absolute power value of the interference or time domain information corresponding to the high interference.

In an exemplary embodiment, sending, by the measurement node, a measurement response message to the LSA controller includes:

carrying, by the measurement node, the measurement result in the measurement response message to send directly to the LSA controller, or carrying, by the measurement node, the measurement result in the measurement response message to send the measurement result to an operation, administration and maintenance side to which the measurement node belongs, and forwarding, by the operation, administration and maintenance side, the measurement response message to the LSA controller.

An apparatus for adaptive interference discovery of a licensed shared access (LSA) system, provided in an LSA controller, includes:

a selection module configured to select a measurement node according to interference protection information of an LSA licensed system;

a configuration module configured to send a measurement configuration message to the measurement node; and a determination module configured to receive a measurement response message returned by the measurement node and determine whether to perform LSA spectrum resource reconfiguration according to the measurement response message.

In an exemplary embodiment, the interference protection information of the LSA licensed system provided by a LSA repository includes one or more pieces of the following information: LSA spectrum resource frequency point, bandwidth, protection zone of the LSA licensed system, interference tolerance threshold at an edge of the protection zone, and transmission information of the LSA licensed system.

In an exemplary embodiment, the protection zone of the LSA licensed system means that an LSA licensed user within the zone is not allowed to suffer harmful interference, and the harmful interference refers to interference that exceeds a predefined interference tolerance threshold; and the transmission information of the LSA licensed system is used for the measurement node to identify a transmitting signal of the LSA licensed system.

In an exemplary embodiment, the selection module is configured to select one or more network devices located at the edge of the protection zone of the LSA licensed system as the measurement node/nodes.

In an exemplary embodiment, the measurement configuration message is used to instruct the measurement node to measure whether a target LSA secondary user device causes interference to the LSA licensed users within the protection zone of the LSA licensed system;

the measurement response message carries a measurement result; and the target LSA secondary user device refers to an LSA secondary user device that has been configured or is intended to be configured with spectrum resource of the LSA licensed system or an adjacent frequency of the spectrum resource of the LSA licensed system.

In an exemplary embodiment, the configuration module is configured to send the measurement configuration message directly to the selected measurement node, or send the measurement configuration message to an operation, administration and maintenance side to which the selected measurement node belongs, and the operation, administration and maintenance side forwards the measurement configuration message to the selected measurement node; wherein the measurement configuration message includes one or more pieces of the following information: measurement identification, measured frequency point, bandwidth, working frequency point and bandwidth of the target LSA secondary user device, information of the LSA licensed system, radio access technology which the target LSA secondary user device uses, duplex mode, uplink and downlink information corresponding to the measured frequency point and bandwidth, transmission information of the target LSA secondary user device, measurement parameter, interference tolerance threshold of the LSA licensed system, the number of measurements, measurement period, and measurement report configuration.

In an exemplary embodiment, the transmission information of the target LSA secondary user device is used for the measurement node to identify the target LSA secondary user device.

In an exemplary embodiment, the measurement parameter is used to indicate interference generated by the target LSA secondary user device at the measurement node; and the measurement parameter includes one or more of the following: receiving power of the predefined transmission information of the target LSA secondary user device at the measurement node; a difference between total receiving powers at the measurement node before and after the target LSA secondary user device operates on the LSA spectrum resource; and total receiving power generated by other systems at the measurement node, except the LSA licensed system.

In an exemplary embodiment, the measurement report configuration is used to indicate a mode in which the measurement response message is reported; and the mode in which the measurement response message is reported includes one or more of the following: single reporting mode, periodic reporting mode, and event triggered reporting mode.

Herein, the single reporting mode means that the measurement result is reported once through the measurement response message;

the periodic reporting mode means that the measurement result is reported periodically through the measurement response message, and the measurement report configuration in the mode further includes: a reporting period and an amount of reporting; and the event triggered reporting mode means that the measurement result is reported through the measurement response message when the measurement result satisfies a reporting condition, and the measurement report configuration in the mode further includes: the reporting condition and the amount of reporting.

In an exemplary embodiment, the measurement report configuration is used to indicate a content of the measurement report; and the content of the measurement report includes one or more pieces of the following information: absolute power value of the interference; indication that is used to indicate whether there is high interference, i.e., indication information that is used to indicate whether the absolute power value of the interference obtained by interference measurement exceeds the interference tolerance threshold of the LSA licensed system; absolute power value of the interference or frequency domain information corresponding to the high interference; and absolute power value of the interference or time domain information corresponding to the high interference.

In an exemplary embodiment, the determination module is configured to determine to perform the LSA spectrum resource reconfiguration when the measurement response message returned by the measurement node shows that the measurement parameter exceeds the interference tolerance threshold at the edge of the protection zone of the LSA licensed system.

An apparatus for adaptive interference discovery of a licensed shared access (LSA) system, provided in a measurement node, includes:

a receiving module configured to receive a measurement configuration message sent by an LSA controller; and a measurement module configured to perform measurement according to the measurement configuration message and send the measurement response message to the LSA controller; wherein the measurement is used to determine whether a target LSA secondary user device causes interference to LSA licensed users within a protection zone of the LSA licensed system.

In an exemplary embodiment, the measurement node has a capability of measuring and interacting with the LSA controller, and is configured to measure whether the target LSA secondary user device causes the interference to the LSA licensed user within the protection zone of the LSA licensed system.

In an exemplary embodiment, the receiving module is configured to receive the measurement configuration message directly from the LSA controller or receive the measurement configuration message sent from the LSA controller and forwarded by an operation, administration and maintenance side;

the measurement configuration message includes one or more pieces of the following information: measurement identification, measured frequency point, bandwidth, working frequency point and bandwidth of the target LSA secondary user device, information of the LSA licensed system, radio access technology which the target LSA secondary user device uses, duplex mode, uplink and downlink information corresponding to the measured frequency point and bandwidth, transmission information of the target LSA secondary user device, measurement parameter, the number of measurements, measurement period, and measurement report configuration.

In an exemplary embodiment, the measurement module is configured to, perform a measurement operation specified in the measurement configuration message to obtain a measurement result;

or cooperate with subordinate terminals to jointly perform the measurement operation specified in the measurement configuration message, and gather, by the measurement node, measurement report of each subordinate terminal to obtain a final measurement result;

or configure the subordinate terminals to perform the measurement operation specified in the measurement configuration message and receive the measurement reports of the terminals to obtain the measurement result.

In an exemplary embodiment, the measurement response message is used to indicate the measurement result to the LSA controller, including one or more pieces of the following information: absolute power value of the interference; indication that is used to indicate whether there is high interference, i.e., indication information that is used to indicate whether the absolute power value of the interference obtained by interference measurement exceeds the interference tolerance threshold of the LSA licensed system; absolute power value of the interference or frequency domain information corresponding to the high interference; and absolute power value of the interference or time domain information corresponding to the high interference.

In an exemplary embodiment, the measurement module is configured to, carry the measurement result in the measurement response message to send directly to the LSA controller, or carry the measurement result in the measurement response message to send to an operation, administration and maintenance side, and the operation, administration and maintenance side forwards the measurement response message to the LSA controller.

A computer readable storage medium has computer executable instructions stored therein, and the computer executable instructions are used for executing the methods described above.

Through the methods in accordance with embodiments of the present disclosure, the LSA secondary system performs interference measurement on the LSA secondary user device by selecting the appropriate measurement node, and determines whether the LSA secondary user device causes interference to the LSA licensed system according to the measurement result to determine whether to perform spectrum resource reconfiguration on the LSA secondary user device. The obtained beneficial effects are that interference situation can be discovered adaptively to avoid the inaccuracy in determining the resource configuration through a theoretical calculation manner; and when the radio environment changes, changes in the interference situation can be discovered in time and the spectrum resource reconfiguration can be triggered, thereby preventing the LSA secondary user device from causing the interference to the LSA licensed system when using the LSA spectrum resource. In addition, the utilization efficiency of the resources is improved as well.

After the drawings and detailed description are read and understood, other aspects can be understood.

DETAILED DESCRIPTION

Embodiments of the present disclosure will be described below in combination with the accompanying drawings.

It should be noted that the embodiments of the present disclosure and features in the embodiments can be combined with each other without conflict. Furthermore, although a logical order is given in flowcharts, in some cases, the steps shown or described herein may be executed in a different order.

Figure 1:
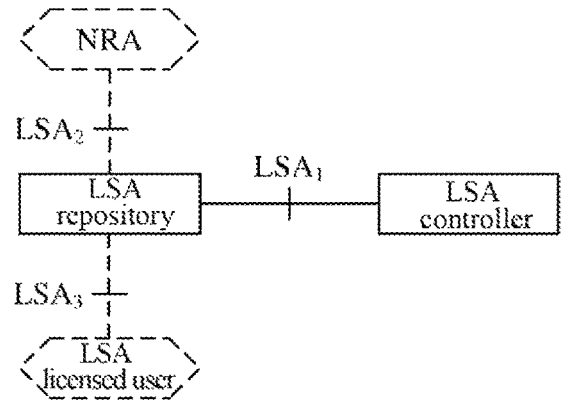
FIG. 1 is a schematic diagram of a functional architecture of an LSA system.
Figure 2:
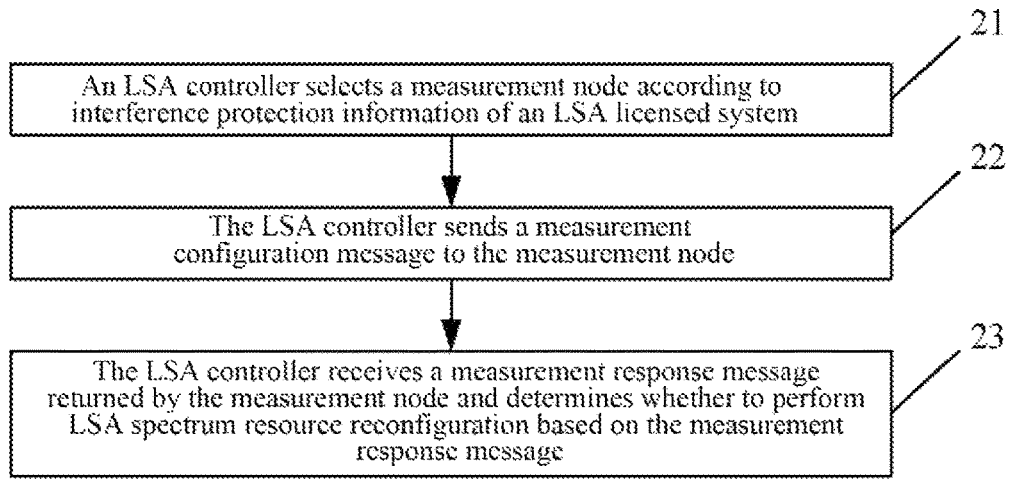
FIG. 2 is a flowchart of a method for adaptive interference discovery of an LSA system (LSA controller side) according to an embodiment of the present disclosure.

A method for adaptive interference discovery of a licensed shared access (LSA) system, as shown in FIG. 2, includes the following steps 21-23.

In step 21, an LSA controller selects a measurement node according to interference protection information of an LSA licensed system.

In step 22, the LSA controller sends a measurement configuration message to the measurement node.

In step 23, the LSA controller receives a measurement response message returned by the measurement node and determines whether to perform LSA spectrum resource reconfiguration based on the measurement response message.

The interference protection information of the LSA licensed system may be provided by a LSA repository, and may include one or more pieces of the following information: LSA spectrum resource frequency point, bandwidth, protection zone of the LSA licensed system, interference tolerance threshold at an edge of the protection zone, and transmission information of the LSA licensed system.

The protection zone of the LSA licensed system may mean that an LSA licensed user within the zone is not allowed to suffer harmful interference. The harmful interference refers to interference that exceeds a predefined interference tolerance threshold.

The transmission information of the LSA licensed system may be used for the measurement node to identify a transmitting signal of the LSA licensed system, which may include but is not limited to a transmitting characteristic sequence of the LSA licensed system.

That the LSA controller selects a measurement node according to interference protection information of an LSA licensed system may include: the LSA controller selects one or more network devices located at the edge of the protection zone of the LSA licensed system as the measurement node/nodes.

The measurement configuration message is used to instruct the measurement node to measure whether a target LSA secondary user device causes interference to the LSA licensed user within the protection zone of the LSA licensed system, and the measurement response message carries a measurement result.

The measurement node has a capability of measuring and interacting with the LSA controller, and may be used to measure whether the target LSA secondary user device causes the interference to the LSA licensed user within the protection zone of the LSA licensed system and to report the measurement result to the LSA controller through the measurement response message.

The target LSA secondary user device may refer to an LSA secondary user device that has been configured or is intended to be configured with spectrum resource of the LSA licensed system or an adjacent frequency of the spectrum resource of the LSA licensed system, including one or more of the following network elements in the LSA secondary system: base station, access point and terminal.

That the LSA controller sends a measurement configuration message to the measurement node may include: the LSA controller sends the measurement configuration message directly to the selected measurement node, or the LSA controller sends the measurement configuration message to an operation, administration and maintenance (OAM) side to which the selected measurement node belongs, and the operation, administration and maintenance side forwards the measurement configuration message to the selected measurement node.

The measurement configuration message may include one or more pieces of the following information: measurement identification, measured frequency point, bandwidth (or working frequency point and bandwidth of the target LSA secondary user device), information of the LSA licensed system, radio access technology which the target LSA secondary user device uses, duplex mode, uplink and downlink information corresponding to the measured frequency point and bandwidth, transmission information of the target LSA secondary user device, measurement parameter, interference tolerance threshold of the LSA licensed system, the number of measurements, measurement period, and measurement report configuration.

The transmission information of the target LSA secondary user device may be used for the measurement node to identify the target LSA secondary user device, and may be, but is not limited to, a predefined transmitting signal sequence, such as a reference signal and the like.

The measurement parameter may be used to indicate interference generated by the target LSA secondary user device at the measurement node; and the measurement parameter may include one or more of the following: receiving power of the predefined transmission information of the target LSA secondary user device at the measurement node; a difference between total receiving powers at the measurement node before and after the target LSA secondary user device operates on the LSA spectrum resource; and total receiving power generated by other systems at the measurement node, except the LSA licensed system.

The measurement report configuration may be used to indicate a mode in which the measurement response message is reported; and the mode in which the measurement response message is reported includes one or more of: single reporting mode, periodic reporting mode, and event triggered reporting mode.

Herein, the single reporting mode means that a measurement result is reported once through the measurement response message;

the periodic reporting mode means that the measurement result is reported periodically through the measurement response message, and the measurement report configuration in this mode includes: a reporting period and an amount of reporting; and the event triggered reporting mode means that the measurement result is reported through the measurement response message when the measurement result satisfies a reporting condition, and the measurement report configuration in this mode includes: the reporting condition and the amount of reporting.

The measurement report configuration may also be used to indicate a content of the measurement report; and the content of the measurement report includes one or more pieces of the following information: an absolute power value of the interference; indication that is used to indicate whether there is high interference, i.e., indication information that is used to indicate whether the absolute power value of the interference obtained by interference measurement exceeds the interference tolerance threshold of the LSA licensed system; an absolute power value of the interference or frequency domain information corresponding to the high interference; and an absolute power value of the interference or time domain information corresponding to the high interference.

That the LSA controller determines whether to perform LSA spectrum resource reconfiguration based on the measurement response message may include: the LSA controller determines to perform the LSA spectrum resource reconfiguration when the measurement response message returned by the measurement node shows that the measurement parameter exceeds the interference tolerance threshold at the edge of the protection zone of the LSA licensed system.

Figure 3:
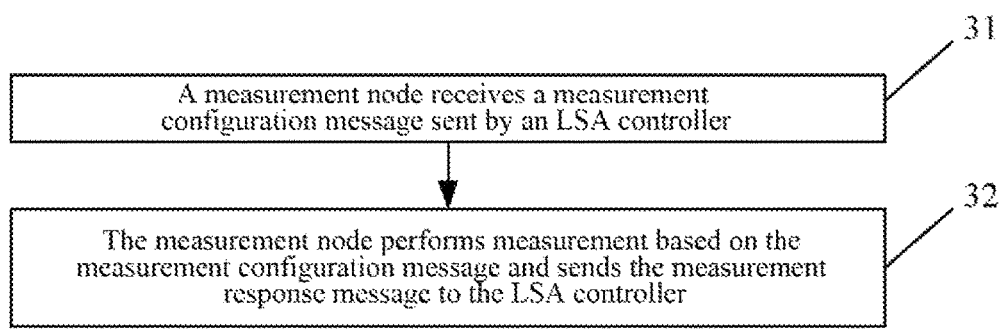
FIG. 3 is a flowchart of a method for adaptive interference discovery of an LSA system (measurement node) according to an embodiment of the present disclosure.

As shown in FIG. 3, a method for adaptive interference discovery of a licensed shared access (LSA) system includes the following steps 31-32.

In step 31, a measurement node receives a measurement configuration message sent by an LSA controller.

In step 32, the measurement node performs measurement based on the measurement configuration message and sends the measurement response message to the LSA controller.

Herein, the measurement is used to determine whether a target LSA secondary user device causes interference to LSA licensed user within a protection zone of the LSA licensed system.

That a measurement node receives a measurement configuration message sent by an LSA controller may include: the measurement node receives the measurement configuration message directly from the LSA controller, or the measurement node receives the measurement configuration message sent from the LSA controller and forwarded by an operation, administration and maintenance (OAM) side.

The measurement configuration message may include one or more pieces of the following information: measurement identification, measured frequency point, bandwidth (or working frequency point and bandwidth of the target LSA secondary user device), information of the LSA licensed system, radio access technology which the target LSA secondary user device uses, duplex mode, uplink and downlink information corresponding to the measured frequency point and bandwidth, transmission information of the target LSA secondary user device, measurement parameter, the number of measurements, measurement period, and measurement report configuration.

That the measurement node performs the measurement based on the measurement configuration message may include: the measurement node performs a measurement operation specified in the measurement configuration message to obtain a measurement result; or the measurement node cooperates with subordinate terminals to jointly perform the measurement operation specified in the measurement configuration message, and the measurement node gathers measurement reports of the subordinate terminals to obtain a final measurement result; or the measurement node configures the subordinate terminals to perform the measurement operation specified in the measurement configuration message and receives the measurement reports of the subordinate terminals to obtain the measurement result.

The measurement response message may be used to indicate the measurement result to the LSA controller, and may include one or more pieces of the following information: absolute power value of the interference; indication that is used to indicate whether there is high interference, i.e., indication information that is used to indicate whether the absolute power value of the interference obtained by interference measurement exceeds the interference tolerance threshold of the LSA licensed system; absolute power value of the interference or frequency domain information corresponding to the high interference; and absolute power value of the interference or time domain information corresponding to the high interference.

That the measurement node sends the measurement response message to the LSA controller includes: the measurement node carries the measurement result in the measurement response message to send directly to the LSA controller, or the measurement node carries the measurement result in the measurement response message to send to an operation, administration and maintenance (OAM) side to which the measurement node belongs, and the OAM side forwards the measurement response message to the LSA controller.

Figure 4:
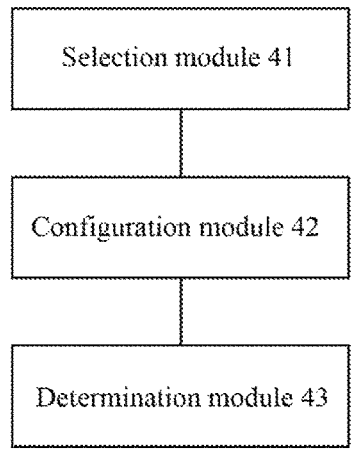
FIG. 4 is a block diagram of an apparatus for adaptive interference discovery of an LSA system (provided in an LSA controller) according to an embodiment of the present disclosure.

As shown in FIG. 4, an apparatus for adaptive interference discovery of a licensed shared access (LSA) system, provided in an LSA controller, includes a selection module 41, a configuration module 42 and a determination module 43.

The selection module 41 is configured to select a measurement node according to interference protection information of an LSA licensed system.

The configuration module 42 is configured to send a measurement configuration message to the measurement node.

The determination module 43 is configured to receive a measurement response message returned by the measurement node and determine whether to perform LSA spectrum resource reconfiguration based on the measurement response message.

The interference protection information of the LSA licensed system may be provided by a LSA repository, and may include one or more pieces of the following information: LSA spectrum resource frequency point, bandwidth, protection zone of the LSA licensed system, interference tolerance threshold at an edge of the protection zone, and transmission information of the LSA licensed system.

The protection zone of the LSA licensed system may mean that LSA licensed user within the zone is not allowed to suffer harmful interference. The harmful interference refers to interference that exceeds a predefined interference tolerance threshold.

The transmission information of the LSA licensed system may be used for the measurement node to identify a transmitting signal of the LSA licensed system.

The selection module 41 is configured to, select one or more network devices located at the edge of the protection zone of the LSA licensed system as the measurement node/nodes.

The measurement configuration message may be used to instruct the measurement node to measure whether a target LSA secondary user device causes interference to the LSA licensed user within the protection zone of the LSA licensed system.

The measurement response message carries a measurement result.

The target LSA secondary user device refers to an LSA secondary user device that has been configured or is intended to be configured with spectrum resource of the LSA licensed system or adjacent frequency of the spectrum resource of the LSA licensed system.

The configuration module 42 is configured to, send the measurement configuration message directly to the selected measurement node, or send the measurement configuration message to an operation, administration and maintenance side to which the selected measurement node belongs, and the operation, administration and maintenance side forwards the measurement configuration message to the selected measurement node.

The measurement configuration message may include one or more pieces of the following information: measurement identification, measured frequency point, bandwidth, working frequency point and bandwidth of the target LSA secondary user device, information of the LSA licensed system, radio access technology which the target LSA secondary user device uses, duplex mode, uplink and downlink information corresponding to the measured frequency point and bandwidth, transmission information of the target LSA secondary user device, measurement parameter, interference tolerance threshold of the LSA licensed system, the number of measurements, measurement period, and measurement report configuration.

The transmission information of the target LSA secondary user device may be used for the measurement node to identify the target LSA secondary user device.

The measurement parameter may be used to indicate interference generated by the target LSA secondary user device at the measurement node; and the measurement parameter may include one or more of the following: receiving power of the predefined transmission information of the target LSA secondary user device at the measurement node; a difference between total receiving powers at the measurement node before and after the target LSA secondary user device operates on the LSA spectrum resource; and total receiving power generated by other systems at the measurement node, except the LSA licensed system.

The measurement report configuration may be used to indicate a mode in which the measurement response message is reported; and the mode in which the measurement response message is reported includes one or more of: single reporting mode, periodic reporting mode, and event triggered reporting mode.

Herein, the single reporting mode means that the measurement result is reported once through the measurement response message;

the periodic reporting mode means that the measurement result is reported periodically through the measurement response message, and the measurement report configuration in this mode further includes: a reporting period and an amount of reporting; and the event triggered reporting mode means that the measurement result is reported through the measurement response message when the measurement result satisfies a reporting condition, and the measurement report configuration in this mode further includes: the reporting condition and the amount of reporting.

The measurement report configuration may be used to indicate content of the measurement report; and the content of the measurement report includes one or more pieces of the following information: absolute power value of the interference; indication that is used to indicate whether there is high interference, i.e., indication information that is used to indicate whether the absolute power value of the interference obtained by interference measurement exceeds the interference tolerance threshold of the LSA licensed system; absolute power value of the interference or frequency domain information corresponding to the high interference; and absolute power value of the interference or time domain information corresponding to the high interference.

The determination module 43 is configured to, determine to perform the LSA spectrum resource reconfiguration when the measurement response message returned by the measurement node shows that the measurement parameter exceeds the interference tolerance threshold at the edge of the protection zone of the LSA licensed system.

Figure 5:
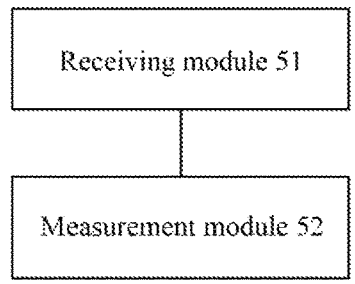
FIG. 5 is a block diagram of an apparatus for adaptive interference discovery of an LSA system (provided in a measurement node) according to an embodiment of the present disclosure.

As shown in FIG. 5, an apparatus for adaptive interference discovery of a licensed shared access (LSA) system, provided in a measurement node, includes a receiving module 51 and a measurement module 52.

The receiving module 51 is configured to receive a measurement configuration message sent by an LSA controller.

The measurement module 52 is configured to perform measurement based on the measurement configuration message and send the measurement response message to the LSA controller. Herein, the measurement is used to determine whether a target LSA secondary user device causes interference to LSA licensed user within a protection zone of the LSA licensed system.

The measurement node has a capability of measuring and interacting with the LSA controller, and may be used to measure whether the target LSA secondary user device causes the interference to the LSA licensed user within the protection zone of the LSA licensed system.

The receiving module 51 is configured to, receive the measurement configuration message directly from the LSA controller, or receive the measurement configuration message sent from the LSA controller and forwarded by an operation, administration and maintenance side.

The measurement configuration message may include one or more pieces of the following information: measurement identification, measured frequency point, bandwidth, working frequency point and bandwidth of the target LSA secondary user device, information of the LSA licensed system, radio access technology which the target LSA secondary user device uses, duplex mode, uplink and downlink information corresponding to the measured frequency point and bandwidth, transmission information of the target LSA secondary user device, measurement parameter, the number of measurements, measurement period, and measurement report configuration.

The measurement module 52 is configured to, perform a measurement operation specified in the measurement configuration message to obtain a measurement result;

or cooperate with subordinate terminals to jointly perform the measurement operation specified in the measurement configuration message, and gather, by the measurement node, measurement reports of the subordinate terminals to obtain a final measurement result;

or configure the subordinate terminals to perform the measurement operation specified in the measurement configuration message and receive the measurement reports of the subordinate terminals to obtain the measurement result.

The measurement response message may be used to indicate the measurement result to the LSA controller, and may include one or more pieces of the following information: absolute power value of the interference; indication that is used to indicate whether there is high interference, i.e., indication information that is used to indicate whether the absolute power value of the interference obtained by interference measurement exceeds the interference tolerance threshold of the LSA licensed system; absolute power value of the interference or frequency domain information corresponding to the high interference; and absolute power value of the interference or time domain information corresponding to the high interference.

The measurement module 52 is configured to, carry the measurement result in the measurement response message to send directly to the LSA controller, or carry the measurement result in the measurement response message to send to an operation, administration and maintenance side to which the measurement node belongs, and the operation, administration and maintenance side forwards the measurement response message to the LSA controller.

Embodiment One

Figure 6:
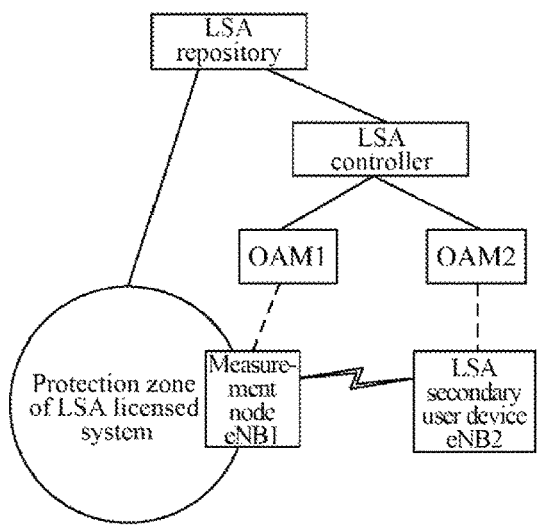
FIG. 6 is a schematic diagram of a deployment scenario corresponding to embodiment one and embodiment two.

FIG. 6 shows a deployment scenario corresponding to the present embodiment, wherein an LSA licensed system and an LSA secondary system are included in the network; wherein a protection zone of the LSA licensed system means that a receiver of the LSA licensed system within the zone cannot be interfered. The LSA secondary system includes an LSA secondary user device, i.e., eNB2, and operation, administration and maintenance system OAM2 of the eNB2.

The LSA secondary user device may be a communication site, such as a macro base station, a micro base station, an access point (e.g., relay), a terminal, or the like, in one or more radio access technologies, of mobile operators. In the present embodiment, the LSA secondary user device is a base station in an LTE access mode.

To realize the LSA secondary user device to share spectrum resource of the LSA licensed system, two logical entities, that is, an LSA repository (LR) and an LSA controller (LC), are introduced on the basis of the existing system architecture. The LR takes charge of the protection of LSA licensed user, and is connected to the national regulatory authority (NRA) and the LSA licensed system to obtain related spectrum usage information of the LSA licensed system, interference protection regulation information, and policy information of the national regulatory authority. Moreover, the information is sent to a spectrum management node of the LSA secondary system, i.e., an LSA controller (LC), and the LC configures working parameters for subordinate LSA secondary user devices according to the related interference protection regulation. In this embodiment, the LC is connected with the eNB2 through the OAM2. A measurement node is selected by the LC according to a protection zone of the LSA licensed system, and is a network device with measurement capability and capable of performing signaling interaction directly with the LC or performing signaling interaction indirectly with the LC through the OAM. The measurement node includes, but is not limited to, an LSA secondary user device under the LC, or a device specially configured to be used for interference measurement. In the present embodiment, the measurement node is an LSA secondary user device eNB1 under the LC, and performs information interaction indirectly with the LC through the OAM1.

Figure 7:
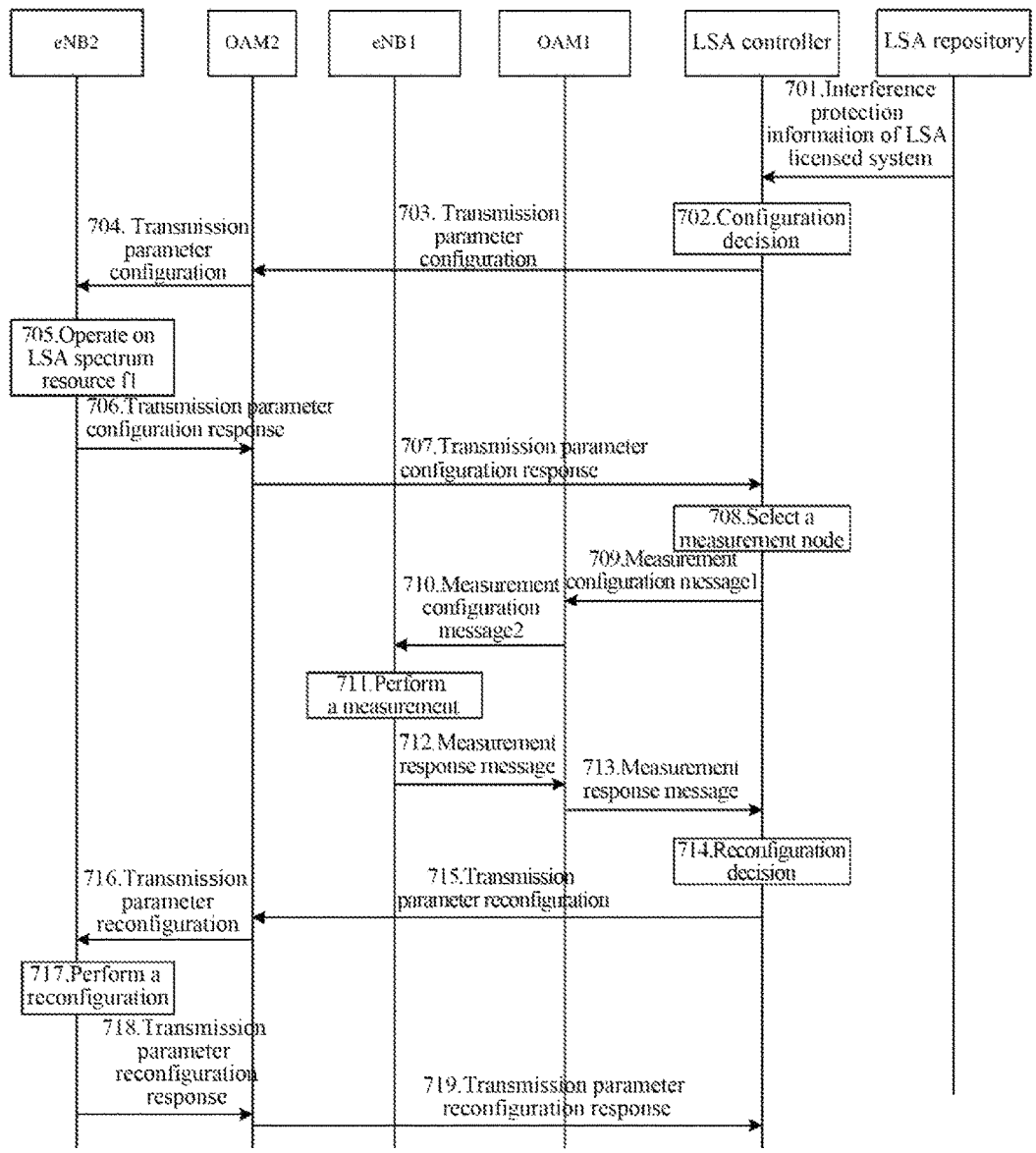
FIG. 7 is a flowchart of the embodiment one and embodiment two.

When the LSA secondary transmitting base station eNB2 using the LSA spectrum resource and the measurement base station eNB1 use the same radio access technology (LTE) and are in neighboring cells, a process for adaptive downlink interference discovery of the eNB2 is as shown in FIG. 7.

In step 701, the LR provides interference protection information of the LSA licensed system for an LSA spectrum resource f1 to the LC, and the interference protection information includes: the frequency point f1 of the LSA spectrum resource, the bandwidth 5 MHz, the protection zone of the LSA licensed system for the frequency point f1, and the interference tolerance threshold −40 dBm at an edge of the protection zone.

In step 702, the LC makes a decision for the LSA spectrum resource configuration, that is, the LC calculates a maximum transmitting power limitation of the eNB2 according to the interference protection information of the LSA licensed system.

That is, the LC calculates the transmitting power (40 dBm is obtained by calculating in this embodiment) of the eNB2, that is, the maximum transmitting power limitation of the eNB2, when the maximum interference at the edge of the protection zone is equal to the interference tolerance threshold −40 dBm based on the range of the protection zone of the LSA licensed system, the interference tolerance threshold at the edge of the protection zone, position coordinates of the eNB2 and a propagation model from the position of the eNB2 to the edge of the protection zone.

In steps 703 to 707, the LC generates a transmission parameter configuration message from the calculated configuration result and send the transmission parameter configuration message to the eNB2 through the operation, administration and maintenance system OAM2 to which the eNB2 belongs. The eNB2 operates at the f1 according to requirements in the transmission parameter configuration message, and feeds back a transmission parameter configuration response message to the LC through the OAM2 to which the eNB2 belongs.

The transmission parameter configuration message includes: working frequency point f1, bandwidth 5 MHz and maximum transmission power limitation 40 dBm.

In the transmission parameter configuration response message, the eNB2 will provide its actually configured transmitting power (which cannot be greater than the transmitting power limitation provided by the LC). In this embodiment, the eNB2 determines the transmitting power to be 40 dBm to meet the coverage requirements.

In step 708, the LC selects a measurement node.

Figure 8:
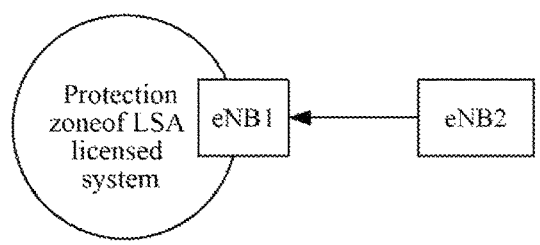
FIG. 8 is a schematic diagram of selection of a measurement node in the embodiment one.

The LC selects a base station near the edge of the protection zone as the measurement node according to the protection zone of the LSA licensed system in interference protection information of the licensed system, to monitor whether the transmission of the eNB2 causes interference to the LSA licensed system. As shown in FIG. 8, when the LC selects the measurement node, a position relationship between the eNB2 and the edge of the protection zone is required to be considered. In an exemplary embodiment, a point at the edge of the protection zone which is nearest from the eNB2 is taken as a reference point, and the eNB1 near the reference point is selected as the measurement node.

In steps 709 to 710, the LC sends a measurement configuration message to the selected measurement node eNB1.

The measurement configuration message is first sent by the LC to the OAM1 to which the eNB1 belongs, and the OAM1 may process the measurement configuration message and then send it to the eNB1.

The measurement configuration message 1 sent by the LC to the OAM1 includes: measurement identification (001), measurement node identification (eNB1), interference tolerance threshold −40 dBm of the LSA licensed system, target LSA secondary user device (eNB2) identification, measurement parameter which is an interference absolute value generated by the eNB2 at the eNB1, and measurement report configuration (event triggered reporting, and triggering event is that when the absolute value of the interference obtained by measuring from the eNB2 exceeds the interference tolerance threshold).

After receiving the measurement configuration message, the OAM1 will send the measurement configuration message 2 to the eNB1, which includes the detailed information of the eNB2 in addition to the information contained in the measurement configuration message 1: the working frequency point f1, the bandwidth 5 MHz, the radio access technology LTE.

Note that in this embodiment, since there is a neighboring cell relationship between subordinate cells of the eNB1 and of the eNB2, it is possible that the eNB1 may have acquired the detailed information of the eNB2 in the previous neighboring cell relationship configuration, and in the case, the measurement configuration message 2 does not need to provide the detailed information of the eNB2 repeatedly.

In step 711, the eNB1 performs the measurement.

The measurement process may be implemented by the existing neighboring cell measurement manner of the LTE. The eNB1 identifies an interference value generated by the eNB2 at the eNB1 by synchronization with an air interface of the eNB2.

In steps 712 to 713, the eNB1 feeds back a measurement response message to the LC when the interference absolute value obtained by measuring exceeds the interference tolerance threshold of the LSA licensed system.

The eNB1 measures the interference absolute value generated by the eNB2 to be −38 dBm, which exceeds the interference tolerance threshold −40 dBm of the LSA licensed system. The measurement response message is generated, and the measurement response message is first sent by the eNB1 to the OAM1 to which the eNB1 belongs, and then sent by the OAM1 to the LC.

The measurement response message includes measurement identification (001), an interference exceeding indication, and interference absolute value −38 dBm, that is, the interference absolute value measured by the eNB1 and generated by the eNB2 exceeds the interference tolerance threshold −40 dBm of the LSA licensed system.

In step 714, the LC performs a reconfiguration decision and forms a reconfiguration decision result into a transmission parameter reconfiguration message.

Transmission parameters of the eNB2 on the LSA spectrum resource f1 are reconfigured. To avoid interference, the decision result is to reduce the transmitting power to 35 dBm.

In steps 715 to 719, the LC sends the transmission parameter reconfiguration message to the eNB2, and the eNB2 performs the transmission parameter reconfiguration according to the reconfiguration message and feeds back a transmission parameter reconfiguration response message to the LC.

The transmission parameter reconfiguration message is first sent by the LC to the OAM2 to which the eNB2 belongs, and then sent by the OAM2 to the eNB2.

The transmission parameter reconfiguration response message is used to indicate a transmission parameter reconfiguration result to the LC. The transmission parameter reconfiguration result is first sent by the eNB2 to the OAM2 to which the eNB2 belongs, and then sent to the LC by the OAM2.

Note that in this embodiment, the eNB1 and the eNB2 belong to different operation, administration and maintenance (OAM) systems, or both of them may belong to the same OAM, in which case the process is similar to that in the present embodiment, the OAM1 and the OAM2 are not required to be differentiated.

Embodiment Two

In the deployment scenario corresponding to the present embodiment shown in FIG. 6, the LSA secondary transmitting base station eNB2 using the LSA spectrum resource and the measurement base station eNB1 use the same radio access technology (LTE), but are in neighboring cells, and a process for adaptive interference discovery reported in a periodic measurement reporting mode is as shown in FIG. 7.

Steps 701 to 708 are the same as steps 701 to 708 of the embodiment one, and will not be repeated herein.

In steps 709 to 710, the LC sends the measurement configuration message 1 to the selected measurement node eNB1.

The measurement configuration message 1 is first sent by the LC to the OAM1 to which the eNB1 belongs. The OAM1 may send the measurement configuration message 2 to the eNB1 after processing the measurement configuration information 1.

The measurement configuration message 1 sent by the LC to the OAM1 includes: measurement identification (001), measurement node identification (eNB1), measurement target LSA secondary user device (eNB2) identification, working frequency point f1 of the eNB2, bandwidth 5 MHz, radio access technology (LTE), transmission information (such as reference signal information) of the eNB2, measurement parameter which is an interference absolute value generated by the eNB2 at the eNB1, measurement period 1 min, measurement time 10 ms and measurement report configuration (periodic reporting, reporting period is 1 min, and the amount of reporting is 10).

After the OAM1 receives the measurement configuration message, the OAM1 will send the measurement configuration message 2 to the eNB1.

Note that in the present embodiment, since there is no neighboring cell relationship between subordinate cells of the eNB1 and the eNB2, the eNB1 does not contain the detailed information of the eNB2. In this case, the measurement configuration message 1 needs to configure all related measurement parameters, and the measurement configuration message 2 is the same as the measurement configuration message 1, and the OAM1 plays the role of forwarding.

In step 711, the eNB1 performs the measurement.

The eNB1 measures the reference signal of the eNB2 to obtain the receiving power of the eNB2 at the eNB1. In this embodiment, the eNB1 performs the measurement every 1 minute for 10 ms to obtain an I value, and measures for 10 times, and reports a measurement result after every time the measurement is completed.

In steps 712 to 713, the eNB1 sends a measurement response message to the LC, and the measurement response message is first sent by the eNB1 to the OAM1 to which the eNB1 belongs, and then sent by the OAM1 to the LC. The received measurement results are in turn: −40 dBm, −41 dBm, −40 dBm, 40 dBm, −43 dBm, −42 dBm, −38 dBm. When the seventh measurement result is received, the LC finds that the interference absolute value has exceeded the interference tolerance threshold of the LSA licensed system, and triggers the reconfiguration decision of the LC.

In step 714, the LC performs a reconfiguration decision and forms a reconfiguration decision result into a transmission parameter reconfiguration message.

Transmission parameters of the eNB2 on the LSA spectrum resource f1 are reconfigured. To avoid interference, the decision result is to reduce the transmitting power to 35 dBm.

In steps 715 to 719, the LC sends the transmission parameter reconfiguration message to the eNB2, and the eNB2 performs the transmission parameter reconfiguration according to the reconfiguration message and feeds back a transmission parameter reconfiguration response message to the LC.

The transmission parameter reconfiguration message is first sent by the LC to the OAM2 to which the eNB2 belongs, and then is sent by the OAM2 to the eNB2.

The transmission parameter reconfiguration response message is used to indicate a transmission parameter reconfiguration result to the LC. The transmission parameter reconfiguration result is first sent by the eNB2 to the OAM2 to which the eNB2 belongs, and then is sent to the LC by the OAM2.

Embodiment Three

Figure 9:
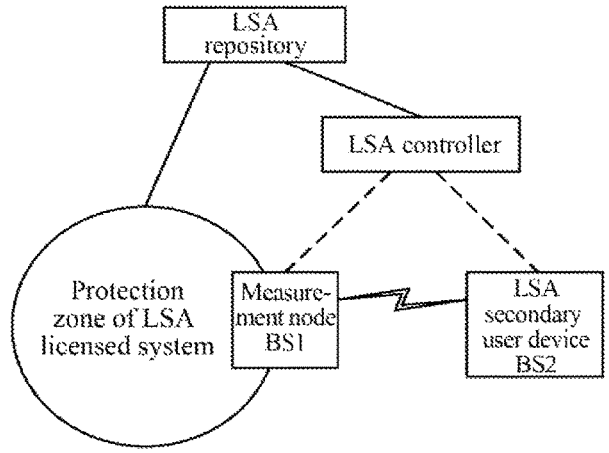
FIG. 9 is a schematic diagram of a deployment scenario corresponding to an embodiment three.

FIG. 9 shows a deployment scenario corresponding to the embodiment of the present disclosure, wherein an LSA licensed system and an LSA secondary system are included in the network; wherein a protection zone of the LSA licensed system means that a receiver of the LSA licensed system within the zone cannot be interfered. The LSA secondary system includes an LSA secondary user device, BS2. An LSA repository (LR) takes charge of the protection of LSA licensed user, and is connected with the national regulatory authority (NRA) and the LSA licensed user Incumbent to obtain related spectrum usage information of the LSA licensed user, interference protection regulation information, and policy information of the national regulatory authority. Moreover, the information is sent to a spectrum management node of the LSA secondary system, i.e., an LSA controller (LC), and the LC configures working parameters for subordinate LSA secondary user devices according to the related interference protection regulation. There is a direct interface between the LC and the LSA secondary user device (BS2). A measurement node is selected by the LC according to a protection zone of the LSA licensed system, and is a network device with measurement capability and capable of performing signaling interaction directly with the LC or performing signaling interaction indirectly with the LC through the OAM. The measurement node includes, but is not limited to, an LSA secondary user device under the LC, or a device specially configured to be used for only measurement. In the present embodiment, the measurement node is an LSA secondary user device eNB1 under the LC, and has a direct interface with the LC.

Figure 10:
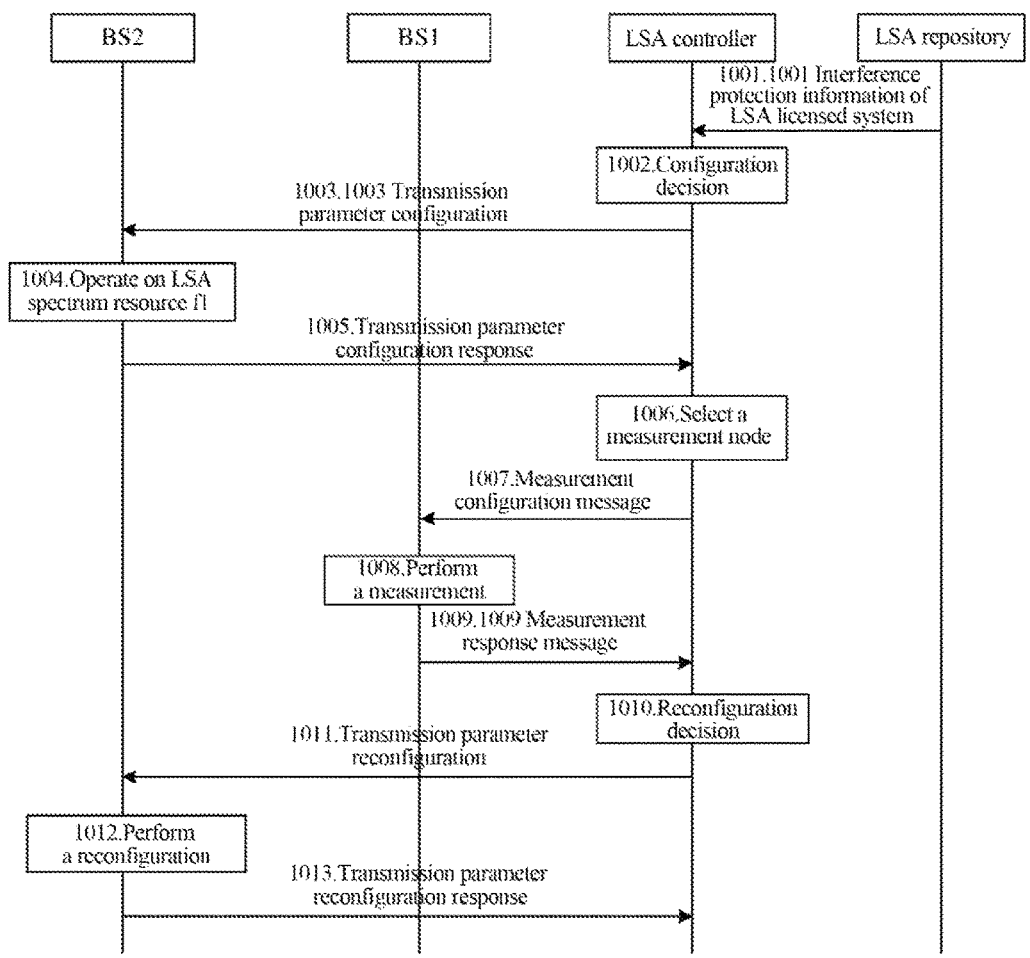
FIG. 10 is a flowchart of the embodiment three.

The LSA secondary transmitting base station BS2 using the LSA spectrum resource and the measurement base station BS1 use different radio access technologies. Here, taking a case in which the BS2 uses the LTE and the BS1 uses the UMTS as an example, when the BS1/BS2 uses other different radio access technologies, the method process is applicable. A process for adaptive interference discovery in an event triggered measurement reporting mode is as shown in FIG. 10.

In step 1001, the LR provides interference protection information of the LSA licensed system for an LSA spectrum resource f1 to the LC, and the interference protection information includes: the frequency point f1 of the LSA spectrum resource, the bandwidth 5 MHz, the protection zone of the LSA licensed system for the frequency point f1, and the interference tolerance threshold −40 dBm at an edge of the protection zone.

In step 1002, the LC makes a decision for the LSA spectrum resource configuration, that is, the LC calculates a maximum transmitting power limitation of the BS2 according to the interference protection information of the LSA licensed system.

That is, the LC calculates the transmitting power (40 dBm is obtained by calculating in this embodiment) of the BS2, that is, the maximum transmitting power limitation of the BS2, when the maximum interference at the edge of the protection zone is equal to the interference tolerance threshold −40 dBm based on the range of the protection zone of the LSA licensed system, the interference tolerance threshold at the edge of the protection zone, position coordinates of the BS2 and a propagation model from the position of the BS2 to the edge of the protection zone.

In steps 1003 to 1005, the LC generates a transmission parameter configuration message from the calculated configuration result and sends the transmission parameter configuration message to the BS2, and the BS2 operates at the f1 according to requirements in the transmission parameter configuration message and feeds back a transmission parameter configuration response message to the LC.

The transmission parameter configuration message includes: working frequency point f1, bandwidth 5 MHz and maximum transmission power limitation 40 dBm.

In the transmission parameter configuration response message, the BS2 will provide its actually configured transmitting power (which cannot be greater than the transmitting power limitation provided by the LC). In this embodiment, the BS2 determines the transmitting power to be 40 dBm to meet the coverage requirements.

In step 1006, the LC selects a measurement node.

The selection manner is the same as the fourth step in the embodiment one, and the BS1 under the UMTS is determined to be the measurement node, and the detailed description will not be repeated herein.

In step 1007, the LC sends a measurement configuration message to the selected measurement node BS1.

The measurement configuration message includes: measurement identification (001), target LSA secondary user device (BS2) identification, radio access technology LTE used by the BS2, working frequency f1, bandwidth 5 MHz, measurement parameter which is an interference absolute value generated by the BS2 at the BS1, measurement report configuration (single reporting, that is, as soon as the measurement is completed, a measurement result is fed back), and transmission characteristics of the LSA licensed system.

In step 1008, the BS1 performs the measurement.

The measurement process is as follows: the total receiving power, denoted by P1, may be measured by the BS1 in combination with its subordinate UEs (such as RSSI measurement); the receiving power, denoted by P2, of the LSA licensed system at the BS1 may be measured (the BS1 and its subordinate measurement UE may identify a transmitting signal of the LSA licensed system according to a characteristic signal detection manner, and then obtain P2). An absolute power value of the interference suffered at the BS1 may be obtained from I=P1−P2. In this embodiment, I=−38 dBm.

When the BS1 cooperates with the subordinate UEs to jointly perform the measurement, the BS1 needs to transmit the measurement configuration message to the UEs, receives a measurement result reported the UEs, and generate a final measurement result in combination with measurement reports of a plurality of UEs.

In step 1009, the BS1 feeds back a measurement response message to the LC.

The measurement response message includes measurement identification (001) and an interference absolute value −38 dBm.

The LC determines that the currently generated interference absolute value has exceeded the interference tolerance threshold −40 dBm of the LSA licensed system according to the interference absolute value of −38 dBm generated by the BS2 and measured by the BS1.

In step 1010, the LC performs a reconfiguration decision and forms a reconfiguration decision result into a transmission parameter reconfiguration message.

Transmission parameters of the BS2 on the LSA spectrum resource f1 are reconfigured. To avoid interference, the decision result is to reduce the transmitting power to 35 dBm.

In steps 1011 to 1013, the LC sends the transmission parameter reconfiguration message to the BS2, and the BS2 performs the transmission parameter reconfiguration according to the reconfiguration message and feeds back a transmission parameter reconfiguration response message to the LC.

The transmission parameter reconfiguration response message is used to indicate a transmission parameter reconfiguration result to the LC.

Note that in the present embodiment, the measurement node BS1 cooperates with the subordinate UEs to jointly perform the measurement operation, and gather measurement results and then reports. Such jointed measurement manner is also applicable in other embodiments of the present disclosure.

Embodiment Four

Figure 11:
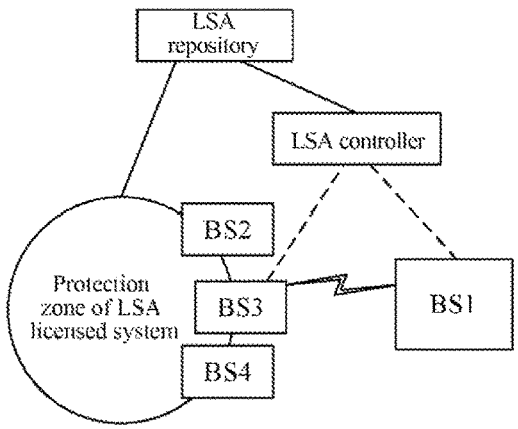
FIG. 11 is a schematic diagram of a deployment scenario corresponding to an embodiment four.
Figure 12:
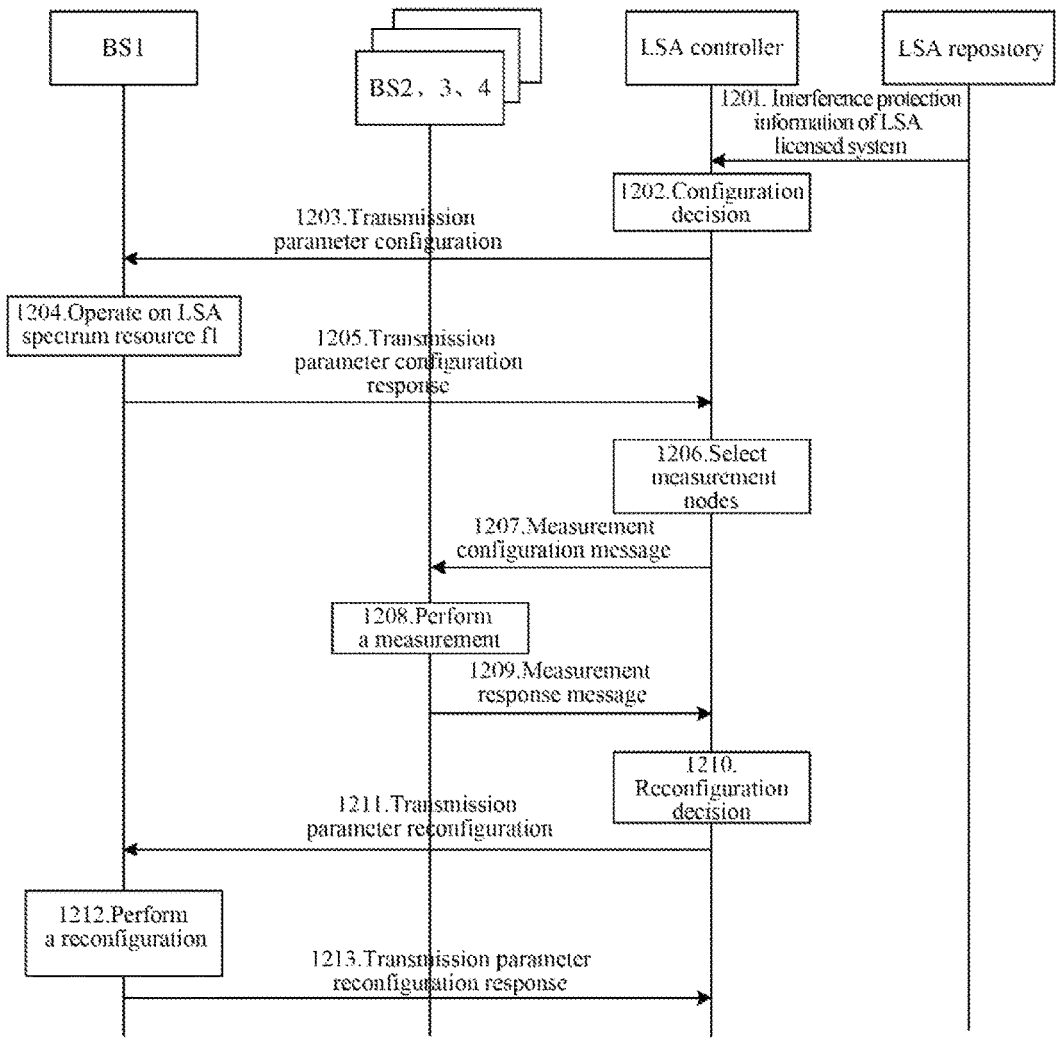
FIG. 12 is a flowchart of the embodiment four.

FIG. 11 shows a deployment scenario corresponding to the embodiment of the present disclosure, which is different from the embodiment three in that the LC selects three measurement nodes to jointly perform the measurement, that is, BS1 is the target LSA secondary user device using the LSA spectrum resource f1, and BS2, BS3, BS4 are the measurement nodes. A process for adaptive interference discovery is as shown in FIG. 12:

Steps 1201 to 1205 are the same as steps 1001 to 1005 of the embodiment three and will not repeated herein.

In step 1206, the LC selects measurement nodes.

The selection manner is the same as the selection principle of step 708 of the embodiment one, except that the LC selects three BSs near the edge of the protection zone as the measurement nodes.

In step 1207, the LC sends a measurement configuration message to the selected measurement nodes BS2-BS4.

The measurement configuration message includes: measurement identification (002, 003 and 004 corresponds to BS2, BS3 and BS4, respectively), target LSA secondary user device (BS1) identification, radio access technology (LTE) used by the BS1, working frequency point f1, bandwidth 5 MHz, measurement parameter which is an interference absolute value generated by the BS1 at each of the measurement nodes, measurement report configuration (single reporting, that is, as soon as the measurement is completed, a measurement result is fed back), and transmission characteristics of the LSA licensed system.

In step 1208, the BS2, BS3, BS4 perform the measurement.

The measurement process is the same as step 711 of the embodiment one of the method. In this embodiment, the measurement results are: I2=−40 dBm, I3=−38 dBm, and I4=−40 dBm.

In step 1209, the BS2, BS3, BS4 feed a measurement response message back to the LC, respectively.

The LC determines that the currently existing measurement result of the measurement node BS3 has exceeded the interference tolerance threshold −40 dBm of the LSA licensed system based on the measurement results of the three nodes, and triggers an LSA spectrum resource reconfiguration decision.

In step 1210, the LC performs the reconfiguration decision and forms a reconfiguration decision result into a transmission parameter reconfiguration message.

Transmission parameters of the BS1 on the LSA spectrum resource f1 are reconfigured. To avoid interference, the decision result is to reduce the transmitting power to 35 dBm.

In steps 1211 to 1213, the LC sends the transmission parameter reconfiguration message to the BS1, and the BS1 performs the transmission parameter reconfiguration according to the reconfiguration message and feeds back a transmission parameter reconfiguration response message to the LC.

The transmission parameter reconfiguration response message is used to indicate a transmission parameter reconfiguration result to the LC.

Note that in this embodiment, the measurement result of one of the three measurement nodes exceeds the interference tolerance threshold, and the LC may determine whether to perform the reconfiguration decision based on the internal algorithm. For example, the LC may also stipulate that the reconfiguration decision is triggered only when the measurement results of all of the measurement nodes exceed the interference tolerance threshold.

Embodiment Five

Figure 13:
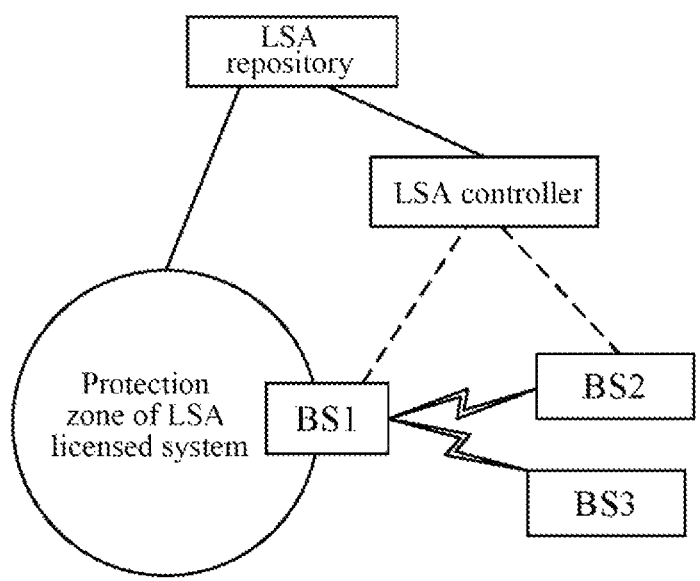
FIG. 13 is a schematic diagram of a deployment scenario corresponding to an embodiment five.
Figure 14:
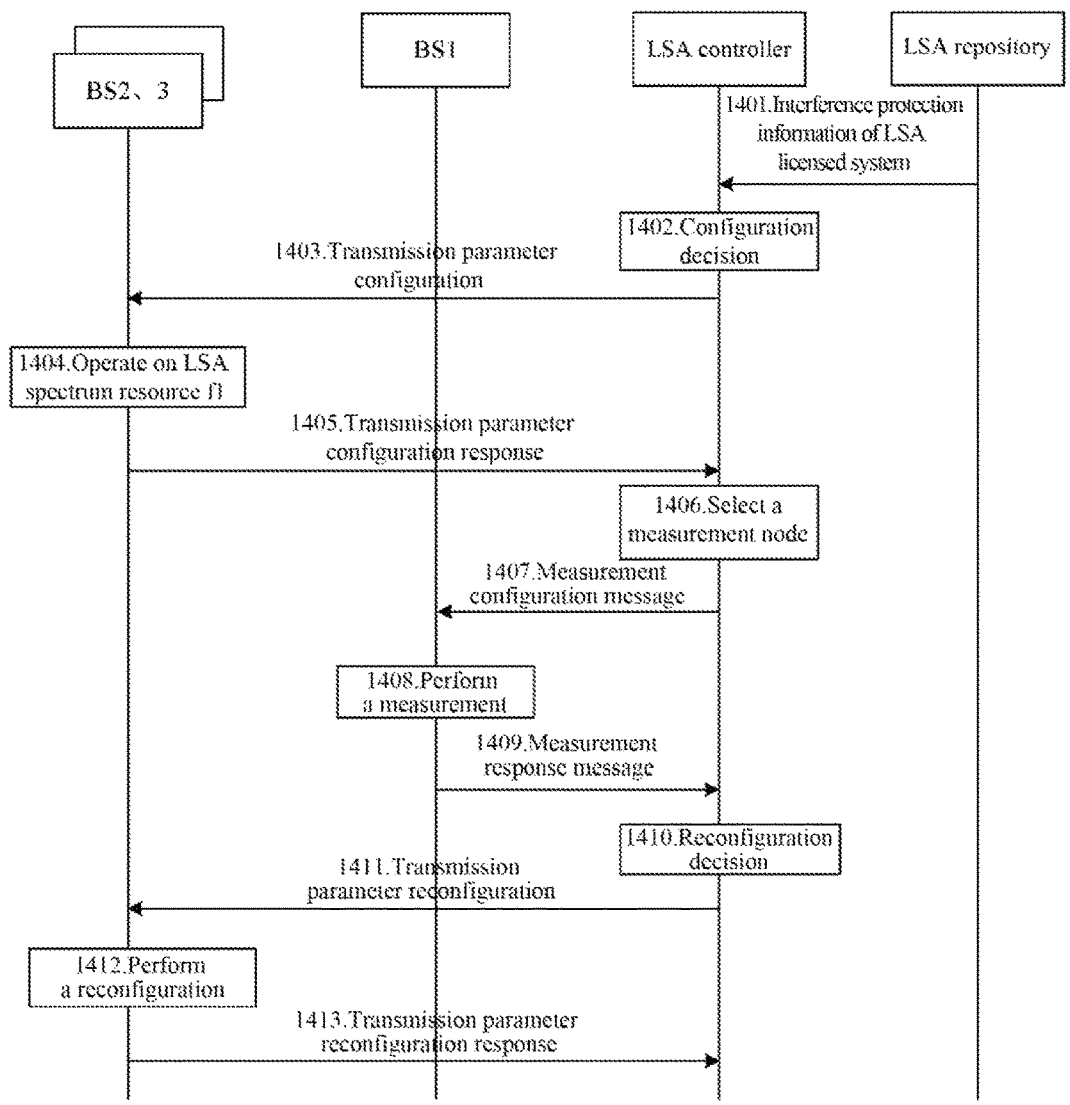
FIG. 14 is a flowchart of the embodiment five.

FIG. 13 shows a deployment scenario corresponding to the embodiment of the present disclosure, which is different from the embodiment three in that there are a plurality of LSA secondary user devices (BS2, BS3) using the LSA spectrum resource, that is, the BS2 and BS3 are target LSA secondary user devices using the LSA spectrum resource f1, and BS1 is the measurement node. A process for adaptive interference discovery is as shown in FIG. 14.

In step 1401, an LR provides interference protection information of the LSA licensed system for the LSA spectrum resource f1 to the LC, and the interference protection information includes: the frequency point f1 of the LSA spectrum resource, the bandwidth 5 MHz, the protection zone of the LSA licensed system for the frequency point f1, and the interference tolerance threshold −40 dBm at an edge of the protection zone.

In step 1402, the LC makes a decision for the LSA spectrum resource configuration, and since at this time there are two LSA secondary user devices expecting to use the LSA spectrum resource, the LC calculates maximum transmitting power limitations of the BS2 and BS3 according to interference protection information of the LSA licensed system.

That is, the LC allocates certain interference limits for the BS2 and BS3 according to the range of the protection zone of the LSA licensed system and the interference tolerance threshold at the edge of the protection zone, i.e., the BS2 and BS3 are allowed to generate their respective interference values at the edge of the protection zone. A principle required to be satisfied is that: the sum of interference values generated by the BS2 and BS3 at the edge of the protection zone does not exceed the interference tolerance threshold at the edge of the protection zone of the LSA licensed system. When the maximum interference values at the edge of the protection zone are equal to the respective interference limits, the transmitting powers (40 dBm and 30 dBm are obtained by calculating in this embodiment) of the BS2 and BS1, that is, maximum transmitting power limitations of the BS2 and BS3, are calculated respectively based on their respective interference limits, position coordinates and propagation models from their respective positions to the edge of the protection zone. The interference limits may be allocated between the two LSA secondary user devices according to policies of operators.

In steps 1403 to 1405, the LC generates a transmission parameter configuration message from the calculated configuration result and sends the transmission parameter configuration message to the BS2 and BS3, and the BS2 and BS3 operate at the f1 according to requirements in the transmission parameter configuration message and feeds back a transmission parameter configuration response message to the LC, respectively.

The transmission parameter configuration message includes: for the BS2, working frequency f1, bandwidth 5 MHz, maximum transmitting power limitation 40 dBm; and for the BS3, working frequency f1, bandwidth 5 MHz, maximum transmitting power limitation 30 dBm.

In step 1406, the LC selects a measurement node.

The selection manner is the same as step 708 of the embodiment one, and the BS1 under the UMTS is determined to be the measurement node, and the detailed description will not be repeated herein.

In step 1407, the LC sends a measurement configuration message to the selected measurement node BS1.

The measurement configuration message includes: measurement identification (001), working frequency f1, bandwidth 5 MHz, measurement parameter which is the received total interference absolute value except signal power of the LSA licensed system, measurement report configuration (single reporting, that is, as soon as the measurement is completed, a measurement result is fed back), and transmission characteristics of the LSA licensed system.

In step 1408, the BS1 performs the measurement.

The measurement process is as follows: the total receiving power, denoted by P1, may be measured by the BS1 (such as RSSI measurement); the receiving power, denoted by P2, of the LSA licensed system at the BS1 may be measured (the BS1 and its subordinate measurement UE may identify a transmitting signal of the LSA licensed system according to a characteristic signal detection manner, and then obtain P2). A total absolute power value of the interference suffered at the BS1 (which may be considered to be generated jointly by the BS2 and BS3) may be obtained from I=P1−P2. In this embodiment, I=−38 dBm.

In step 1409, the BS1 feeds back a measurement response message to the LC.

The measurement response message includes measurement identification (001) and an interference absolute value −38 dBm.

The LC determines that the currently generated interference absolute value has exceeded the interference tolerance threshold −40 dBm of the LSA licensed system according to the interference absolute value of −38 dBm generated by the BS2 and measured by the BS1.

In step 1410, the LC performs a reconfiguration decision and forms a reconfiguration decision result into a transmission parameter reconfiguration message.

Transmission parameters of the BS2 on the LSA spectrum resource f1 are reconfigured. To avoid interference, the decision result is to reduce the transmitting power to 35 dBm. The transmitting power of the BS3 will not be adjusted.

In steps 1411 to 1413, the LC sends the transmission parameter reconfiguration message to the BS2, and the BS2 performs the transmission parameter reconfiguration according to the reconfiguration message and feeds back a transmission parameter reconfiguration response message to the LC.

Embodiment Six

Figure 15:
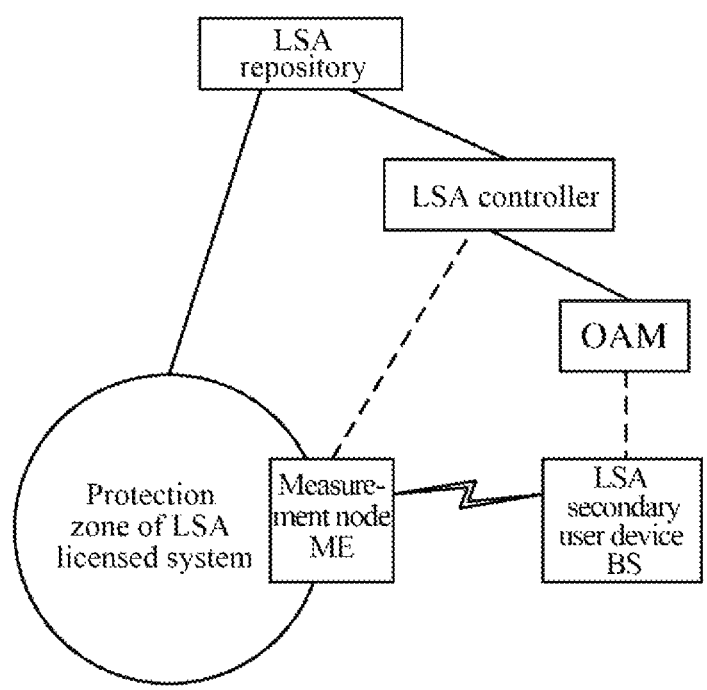
FIG. 15 is a schematic diagram of a deployment scenario corresponding to an embodiment six.

FIG. 15 shows a deployment scenario corresponding to the embodiment of the present disclosure, wherein an LSA licensed system and an LSA secondary system are included in the network; wherein a protection zone of the LSA licensed system means that a receiver of the LSA licensed system within the zone cannot be interfered.

The LSA secondary system includes an LSA secondary user device (BS), and operation, administration and maintenance (OAM) system of the LSA secondary user device (BS).

An LSA repository (LR) takes charge of the protection of LSA licensed user, and is connected with the national regulatory authority (NRA) and the LSA licensed user Incumbent to obtain related spectrum usage information of the LSA licensed user, interference protection regulation information, and policy information of the national regulatory authority. Moreover, the information is sent to a spectrum management node of an LSA secondary user device, i.e., an LSA controller (LC), and the LC configures working parameters for subordinate LSA secondary user devices by the LC according to the related interference protection regulation. The LC is connected with the BS by the OAM.

A measurement node is selected by the LC according to a protection zone of the LSA licensed system, and is a network device with measurement capability and capable of performing signaling interaction directly with the LC or performing signaling interaction indirectly with the LC through the OAM. The measurement node includes, but is not limited to, an LSA secondary user device under the LC, or a device specially configured to be used for only measurement. In the present embodiment, the measurement node is a device specially configured to be used for only measurement (Measurement Equipment, ME), and has a direct interface with the LC.

Figure 16:
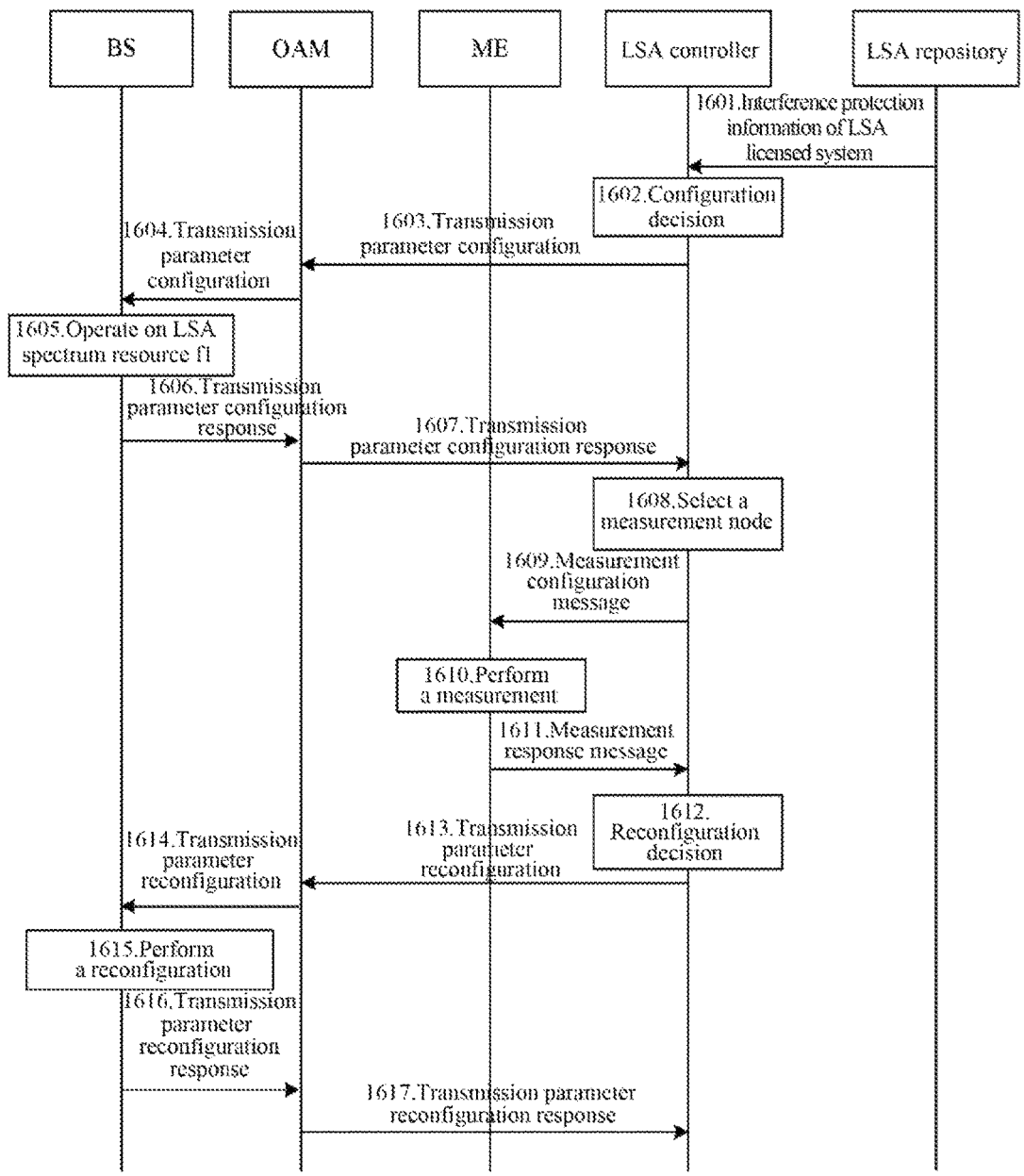
FIG. 16 is a flowchart of the embodiment six.

The LSA secondary transmitting base station BS using the LSA spectrum resource uses the LTE, and the measurement node ME is a dedicated measurement device. A process for adaptive interference discovery reported in an event triggered measurement reporting mode is as shown in FIG. 16.

In step 1601, the LR provides interference protection information of the LSA licensed system for an LSA spectrum resource f1 to the LC, and the interference protection information includes: the frequency point f1 of the LSA spectrum resource, the bandwidth 5 MHz, the protection zone of the LSA licensed system for the frequency point f1, and the interference tolerance threshold −40 dBm at an edge of the protection zone.

In step 1602, the LC makes a decision for the LSA spectrum resource configuration, that is, the LC calculates the maximum transmitting power limitation of the BS according to the interference protection information of the LSA licensed system.

That is, the LC calculates the transmitting power (40 dBm is obtained by calculating in this embodiment) of the BS, that is, the maximum transmitting power limitation of the BS, when the maximum interference at the edge of the protection zone is equal to the interference tolerance threshold −40 dBm based on the range of the protection zone of the LSA licensed system, the interference tolerance threshold at the edge of the protection zone, position coordinates of the BS and a propagation model from the position of the BS to the edge of the protection zone.

In steps 1603 to 1607, the LC generates a transmission parameter configuration message from the calculated configuration result and sends the transmission parameter configuration message to the OAM to which the BS2 belongs, and forwards it the BS, and the BS operates at the f1 according to requirements in the transmission parameter configuration message and sends a transmission parameter configuration response message to the LC through forwarding of OAM.

The transmission parameter configuration message includes: working frequency point f1, bandwidth 5 MHz and maximum transmission power limitation 40 dBm.

In the transmission parameter configuration response message, the BS will provide its actually configured transmitting power (which cannot be greater than the transmitting power limitation provided by the LC). In this embodiment, the BS determines the transmitting power to be 40 dBm to meet the coverage requirements.

In step 1608, the LC selects a measurement node.

The selection manner is similar to step 708 of the embodiment one, except that the measurement node in this embodiment is a dedicated measurement device, and finally the ME is determined to be the measurement node, and the detailed description will not be repeated herein.

In step 1609, the LC sends a measurement configuration message to the selected measurement node ME.

The measurement configuration message includes: measurement identification (001), target LSA secondary user device (BS) identification, radio access technology LTE used by the BS, working frequency f1, bandwidth 5 MHz, measurement parameter which is an interference absolute value generated by the BS at the ME, and measurement report configuration (single reporting, that is, as soon as the measurement is completed, a measurement result is fed back).

In step 1610, the ME performs the measurement.

The measurement process is as follows: the dedicated measurement device ME always measures and maintains its total receiving power value at its position. Therefore, the ME searches for its total receiving power value, denoted by P1, prior to configuration of the BS, and P1 may be considered as the receiving power of the LSA licensed system at the ME; the ME further measures the total receiving power value, denoted by P2, after the BS begins to operate, and P2 may be considered as the sum of a receiving power of the LSA licensed system and a receiving power generated by BS at the ME. Thus, I=P2−P1 is an interference absolute value (e.g., −38 dBm) generated at the ME after the BS operates.

In step 1611, the ME feeds back a measurement response message to the LC.

The measurement response message includes measurement identification (001) and an interference absolute value −38 dBm.

The LC determines that the currently generated interference absolute value has exceeded the interference tolerance threshold −40 dBm of the LSA licensed system according to the interference absolute value −38 dBm generated by the BS and measured by the ME.

In step 1612, the LC performs a reconfiguration decision and forms a reconfiguration decision result into a transmission parameter reconfiguration message.

Transmission parameters of the BS on the LSA spectrum resource f1 are reconfigured. To avoid interference, the decision result is to reduce the transmitting power to 35 dBm.

In steps 1613 to 1617, the LC sends the transmission parameter reconfiguration message to the OAM to which the BS belongs, and forwards the transmission parameter reconfiguration message to the BS, and the BS performs the transmission parameter reconfiguration according to the reconfiguration message and feeds back a transmission parameter reconfiguration response message to the LC through OAM.

The transmission parameter reconfiguration response message is used to indicate a transmission parameter reconfiguration result to the LC.

Embodiment Seven

Figure 17:
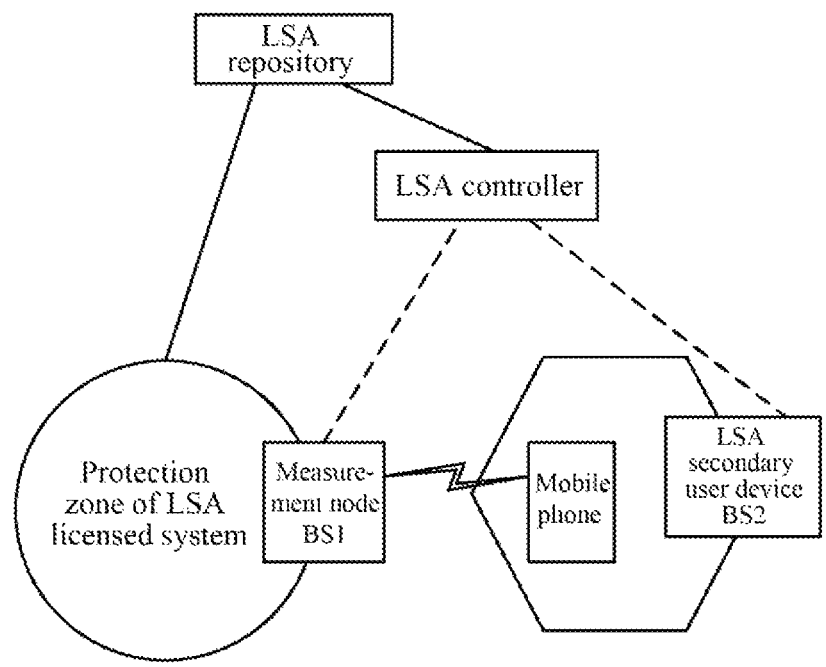
FIG. 17 is a schematic diagram of a deployment scenario corresponding to an embodiment seven.
Figure 18:
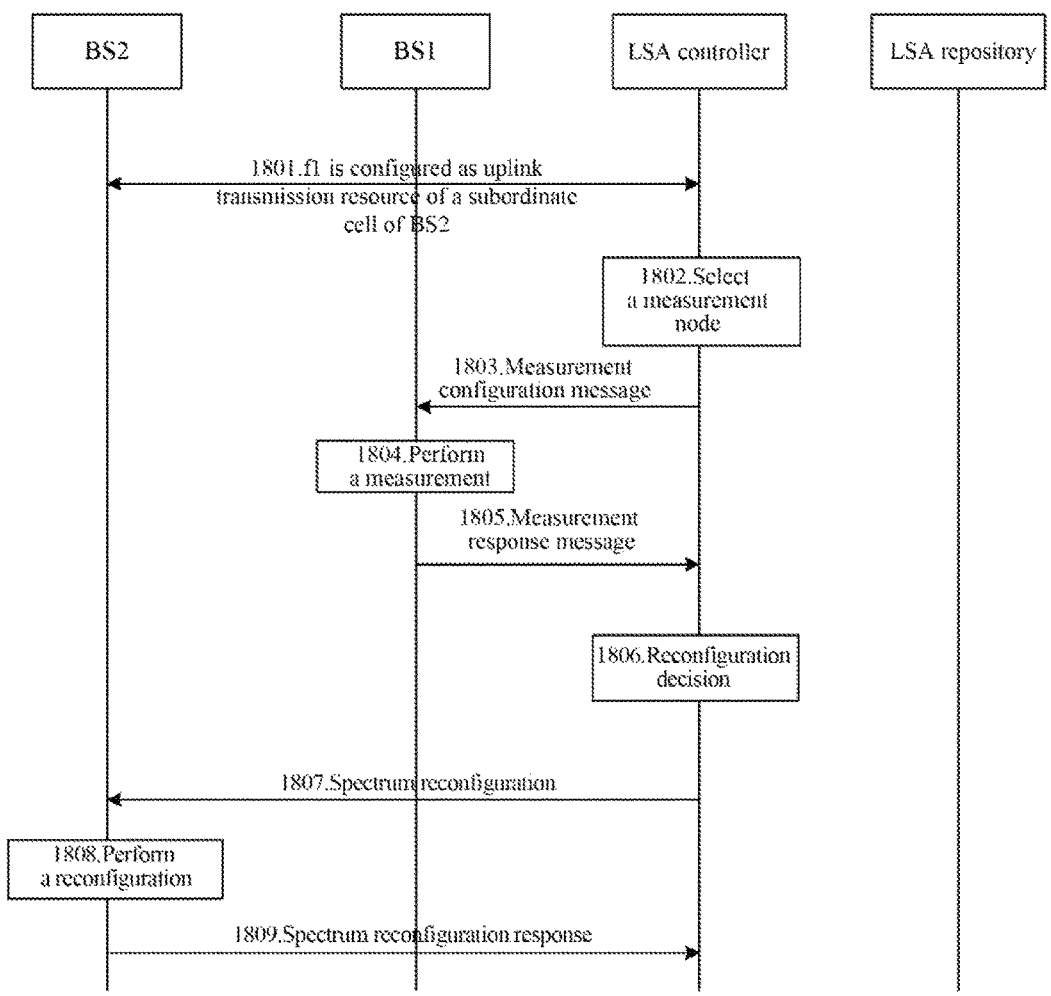
FIG. 18 is a flowchart of the embodiment seven.

In a deployment scenario corresponding to the embodiment as shown in FIG. 17, the LSA spectrum resource is configured as uplink and downlink in an FDD duplex mode, the base station to which the LSA spectrum resource belongs is BS2, and a process for adaptive uplink interference discovery is as shown in FIG. 18.

In step 1801, the LC allocates the LSA spectrum resource to the LSA secondary user device BS2 and configures it as uplink.

In step 1802, the LC selects a measurement node.

The selection manner is the same as step 708 of the embodiment one, in and the BS1 is determined to be the measurement node, and the detailed description will not be repeated herein.

In step 1803, the LC sends a measurement configuration message to the selected measurement node BS1.

The measurement configuration message includes: measurement identification (001), working frequency f1, bandwidth 5 MHz, measurement parameter which is an interference absolute value generated at the BS1 by uplink transmission of a subordinate cell of the BS2, measurement report configuration (single reporting, that is, as soon as the measurement is completed, a measurement result is fed back), and transmission characteristics of the LSA licensed system.

In step 1804, the BS1 performs the measurement.

The measurement process is as follows: the total receiving power, denoted by P1, may be measured by the BS1 (such as RSSI measurement); the transmitting signal of the LSA licensed system is identified based on the transmission characteristics of the LSA licensed system, and the receiving power, denoted by P2, of the LSA licensed system at the BS1 may be measured (the BS1 may identify the transmitting signal of the LSA licensed system according to a characteristic signal detection manner, and then obtain P2). An absolute power value of the interference suffered at the BS1, i.e., an uplink interference absolute power value of the subordinate cell of the BS2, may be obtained from I=P1−P2. In this embodiment, I=−30 dBm.

In step 1805, the BS1 feeds back a measurement response message to the LC.

The measurement response message includes measurement identification (001), a measurement frequency point f1 and an interference absolute value −30 dBm.

The LC determines that the currently generated interference absolute value has exceeded the interference tolerance threshold −40 dBm of the LSA licensed system according to the interference absolute value −30 dBm generated by the uplink transmission of the subordinate cell of the BS2 and measured by the BS1.

In step 1806, the LC performs a reconfiguration decision and forms a reconfiguration decision result into a transmission parameter reconfiguration message.

The LC determines that an interference source is the uplink transmission of the UE of the subordinate cell of the BS2 according to the interference frequency point, decides to perform reconfiguration on uplink working frequency of the subordinate cell of the BS2, and there is an LSA spectrum resource f2 in the position of the current cell, and decides to configure the new spectrum resource f2 to the uplink transmission of the subordinate cell of the BS2.

In steps 1807 to 1809, the LC sends a transmission parameter reconfiguration message to the BS2, and the BS2 performs reconfiguration of the uplink frequency according to the reconfiguration message and feeds back a transmission parameter reconfiguration response message to the LC.

The transmission parameter reconfiguration response message is used to indicate a reconfiguration result of the uplink frequency to the LC.

Note that in the present embodiment, the LSA secondary user device is configured as a subordinate UE of the BS2, that is, the LSA spectrum resource f1 is configured as uplink resource. At this time, it can be determined that the interference comes from the uplink transmission of the UE according to the interference frequency point. When the LSA spectrum resource is allocated to the TDD system, there will be both uplink and downlink interferences at the measurement node BS1. At this time, the measurement node may further provide time domain information corresponding to the measurement result so that the LC or BS2 can further determine whether the interference is downlink interference generated by the base station or uplink interference generated by the UE, and reconfigure transmission parameters of the interference source to avoid or relieve the interference situation.

The embodiments of the present disclosure are described by taking measurements of co-channel interference as an example, and the method is also applicable to measurement of adjacent frequency interference. For example, the spectrum of the LSA licensed system is f1, and the uplink/downlink of the target LSA secondary user device is configured on an adjacent frequency of f1. At this point, the interference caused by the LSA secondary user device to the adjacent frequency of its working frequency (i.e., f1) due to adjacent frequency leakage may also be measured by the measurement node. When the absolute power value of the interference caused on f1 exceeds the interference tolerance threshold of the LSA licensed system, reconfiguration of the target LSA secondary user device by the LC will also be triggered.

Those ordinary skilled in the art can understand that all or parts of steps of the above-mentioned embodiments can be implemented by using computer program processes. The computer program may be stored in one computer readable storage medium. The computer program is executed on the corresponding hardware platform (e.g., system, equipment, apparatus, device, etc), and when the computer program is executed, one of steps of the method embodiments or the combination thereof is included.

In an exemplary embodiment, all or parts of steps of the above-mentioned embodiments can also be implemented by using integrated circuits, and these steps can be fabricated into individual integrated circuit modules respectively, or multiple modules or steps in these steps are fabricated into a single integrated circuit to implement.

Various apparatuses/functional modules/functional units in the embodiments described above, which can be implemented by using general computing apparatuses, can be centralized on a single computing apparatus or distributed across a network formed from multiple computing apparatus.

Various apparatuses/functional modules/functional units in the embodiments described above, when implemented in a form of software functional module and sold or used as stand-stone products, can be stored in a computer readable storage medium. The above-mentioned computer readable storage medium may be read-only memory, disk or compact disc, etc.

INDUSTRIAL APPLICABILITY

Through the embodiments of the present disclosure, interference situation can be discovered adaptively to avoid the inaccuracy by determining the resource configuration through a theoretical calculation manner; and when the radio environment changes, changes in the interference situation can be discovered in time and the spectrum resource reconfiguration can be triggered, thereby preventing the LSA secondary user device from causing the interference to the LSA licensed system when using the LSA spectrum resource. In addition, the utilization efficiency of the resources is improved as well.

What we claim is:

1. A method for adaptive interference discovery of a licensed shared access, LSA, system comprising:
   selecting, by an LSA controller, a measurement node according to interference protection information of an LSA licensed system;
   sending, by the LSA controller, a measurement configuration message to the measurement node; and
   receiving, by the LSA controller, a measurement response message returned by the measurement node, and determining whether to perform an LSA spectrum resource reconfiguration according to the measurement response message.

2. The method according to claim 1, wherein
the interference protection information of the LSA licensed system provided by an LSA repository comprises one or more pieces of the following information: LSA spectrum resource frequency point, bandwidth, protection zone of the LSA licensed system, interference tolerance threshold at an edge of the protection zone, and transmission information of the LSA licensed system.

3. The method according to claim 2, wherein
the protection zone of the LSA licensed system means that an LSA licensed user within the zone is not allowed to suffer harmful interference, and the harmful interference refers to interference that exceeds a predefined interference tolerance threshold; and
the transmission information of the LSA licensed system is used for the measurement node to identify a transmitting signal of the LSA licensed system.

4. The method according to claim 1, wherein
the selecting, by an LSA controller, a measurement node according to interference protection information of an LSA licensed system comprises: selecting, by the LSA controller, one or more network devices located at an edge of a protection zone of the LSA licensed system as the measurement node/nodes.

5. The method according to claim 1, wherein
the measurement configuration message is used to instruct the measurement node to measure whether a target LSA secondary user device causes interference to an LSA licensed user within a protection zone of the LSA licensed system;
the measurement response message carries a measurement result; and
the target LSA secondary user device refers to an LSA secondary user device that has been configured or is intended to be configured with a spectrum resource of the LSA licensed system or an adjacent frequency of the spectrum resource of the LSA licensed system.

6. The method according to claim 1, wherein the sending, by the LSA controller, a measurement configuration message to the measurement node comprises:
   sending, by the LSA controller, the measurement configuration message directly to the selected measurement node, or sending, by the LSA controller, the measurement configuration message to an operation, administration and maintenance side to which the selected measurement node belongs, and forwarding, by the operation, administration and maintenance side, the measurement configuration message to the selected measurement node; wherein
the measurement configuration message comprises one or more pieces of the following information: measurement identification, measured frequency point, bandwidth, working frequency point and bandwidth of a target LSA secondary user device, information of the LSA licensed system, radio access technology which the target LSA secondary user device uses, duplex mode, uplink and downlink information corresponding to the measured frequency point and bandwidth, transmission information of the target LSA secondary user device, measurement parameter, interference tolerance threshold of the LSA licensed system, number of measurements, measurement period, and measurement report configuration.

7. The method according to claim 6, wherein
the transmission information of the target LSA secondary user device is used for the measurement node to identify the target LSA secondary user device; and
the measurement parameter is used to indicate interference generated by the target LSA secondary user device at the measurement node; and the measurement parameter comprises one or more of the following: receiving power of the predefined transmission information of the target LSA secondary user device at the measurement node; a difference between total receiving powers at the measurement node before and after the target LSA secondary user device operates on the LSA spectrum resource; and total receiving power generated by other systems at the measurement node, except the LSA licensed system.

8. The method according to claim 6, wherein
the measurement report configuration is used to indicate a mode in which the measurement response message is reported; and the mode in which the measurement response message is reported comprises one or more of the following: single reporting mode, periodic reporting mode, and event triggered reporting mode;
wherein the single reporting mode means that a measurement result is reported once through the measurement response message;
the periodic reporting mode means that the measurement result is reported periodically through the measurement response message, and the measurement report configuration in the mode further comprises: a reporting period and an amount of reporting; and
the event triggered reporting mode means that the measurement result is reported through the measurement response message when the measurement result satisfies a reporting condition, and the measurement report configuration in the mode further comprises: the reporting condition and the amount of reporting.

9. The method according to claim 6, wherein
the measurement report configuration is used to indicate a content of the measurement report; and the content of the measurement report comprises one or more pieces of the following information: absolute power value of the interference; indication that is used to indicate whether there is high interference, i.e., indication information that is used to indicate whether the absolute power value of the interference obtained by interference measurement exceeds the interference tolerance threshold of the LSA licensed system; absolute power value of the interference or frequency domain information corresponding to the high interference; and absolute power value of the interference or time domain information corresponding to the high interference.

10. The method according to claim 9, wherein the determining, by the LSA controller, whether to perform LSA spectrum resource reconfiguration according to the measurement response message comprises:

determining, by the LSA controller, to perform the LSA spectrum resource reconfiguration when the measurement response message returned by the measurement node shows that the measurement parameter exceeds the interference tolerance threshold at an edge of a protection zone of the LSA licensed system.

11. A non-transitory computer readable storage medium where computer executable instructions are stored, wherein the computer executable instructions are used to execute the methods according to claim 1.

12. A method for adaptive interference discovery of a licensed shared access, LSA, system comprising:

receiving, by a measurement node, a measurement configuration message sent by an LSA controller; and performing, by the measurement node, measurement according to the measurement configuration message and sending a measurement response message to the LSA controller;

wherein the measurement is used to determine whether a target LSA secondary user device causes interference to an LSA licensed user within a protection zone of the LSA licensed system.

13. The method according to claim 12, wherein the receiving, by a measurement node, a measurement configuration message sent by an LSA controller comprises:

receiving, by the measurement node, the measurement configuration message directly from the LSA controller, or receiving, by the measurement node, the measurement configuration message sent from the LSA controller and forwarded by an operation, administration and maintenance side; and the measurement configuration message comprises one or more pieces of the following information: measurement identification, measured frequency point, bandwidth, working frequency point and bandwidth of the target LSA secondary user device, information of the LSA licensed system, radio access technology which the target LSA secondary user device uses, duplex mode, uplink and downlink information corresponding to the measured frequency point and bandwidth, transmission information of the target LSA secondary user device, measurement parameter, number of measurements, measurement period, and measurement report configuration.

14. The method according to claim 12, wherein the performing, by the measurement node, measurement according to the measurement configuration message comprises:

performing, by the measurement node, a measurement operation specified in the measurement configuration message to obtain a measurement result;

or cooperating, by the measurement node, with subordinate terminals to jointly perform the measurement operation specified in the measurement configuration message, and gathering, by the measurement node, measurement reports of the subordinate terminals to obtain a final measurement result;

or configuring, by the measurement node, the subordinate terminals to perform the measurement operation specified in the measurement configuration message and receiving the measurement reports of the subordinate terminals to obtain the measurement result.

15. The method according to claim 12, wherein sending, by the measurement node, a measurement response message to the LSA controller comprises:

carrying, by the measurement node, the measurement result in the measurement response message to send directly to the LSA controller, or carrying, by the measurement node, the measurement result in the measurement response message to send to an operation, administration and maintenance side to which the measurement node belongs, and forwarding, by the operation, administration and maintenance side, the measurement response message to the LSA controller.

16. A non-transitory computer readable storage medium where computer executable instructions are stored, wherein the computer executable instructions are used to execute the method according to claim 12.

17. An apparatus for adaptive interference discovery of a licensed shared access, LSA, system, provided in an LSA controller, comprising hardware performing instructions stored in a non-transitory computer readable medium which executes steps in following modules:

a selection module configured to select a measurement node according to interference protection information of an LSA licensed system;

a configuration module configured to send a measurement configuration message to the measurement node; and a determination module configured to receive a measurement response message returned by the measurement node and determine whether to perform LSA spectrum resource reconfiguration according to the measurement response message.

18. An apparatus for adaptive interference discovery of a licensed shared access, LSA, system, provided in a measurement node, comprising hardware performing instructions stored in a non-transitory computer readable medium which executes steps in following modules:

a receiving module configured to receive a measurement configuration message sent by an LSA controller; and a measurement module configured to perform measurement according to the measurement configuration message and send the measurement response message to the LSA controller; wherein the measurement is used to determine whether a target LSA secondary user device causes interference to an LSA licensed user within a protection zone of the LSA licensed system.

* * * * *